United States Patent
Takeda et al.

(10) Patent No.: US 11,895,657 B2
(45) Date of Patent: Feb. 6, 2024

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 93 days.

(21) Appl. No.: 16/758,134

(22) PCT Filed: Oct. 23, 2017

(86) PCT No.: PCT/JP2017/038219
§ 371 (c)(1),
(2) Date: Apr. 22, 2020

(87) PCT Pub. No.: WO2019/082247
PCT Pub. Date: May 2, 2019

(65) Prior Publication Data
US 2020/0288458 A1  Sep. 10, 2020

(51) Int. Cl.
*H04L 1/1812* (2023.01)
*H04W 72/21* (2023.01)

(52) U.S. Cl.
CPC .......... *H04W 72/21* (2023.01); *H04L 1/1812* (2013.01)

(58) Field of Classification Search
CPC .......... H04W 72/0413; H04W 72/04; H04W 72/1268; H04W 72/1284; H04W 72/0446; H04W 72/21; H04L 1/1812; H04L 5/0057; H04L 5/0055; H04L 1/1861; H04L 5/005
See application file for complete search history.

(56) References Cited

U.S. PATENT DOCUMENTS

| | | | |
|---|---|---|---|
| 10,630,433 B2 * | 4/2020 | Yang | H04L 1/1861 |
| 2016/0094996 A1 * | 3/2016 | Xiong | H04W 72/21 |
| | | | 370/329 |
| 2017/0238305 A1 | 8/2017 | Chen et al. | |
| 2019/0132104 A1 * | 5/2019 | Lee | H04L 1/1664 |

(Continued)

FOREIGN PATENT DOCUMENTS

| | | |
|---|---|---|
| WO | 2016/002441 A1 | 1/2016 |
| WO | 2016/093600 A1 | 6/2016 |
| WO | 2017/173177 A1 | 10/2017 |

OTHER PUBLICATIONS

3GPP TSG RAN WG1 Meeting #90; R1-1713945 "UCI on PUSCH" NTT DoCoMo, Inc.; Prague, Czechia; Aug. 21-25, 2017 (7 pages).

(Continued)

*Primary Examiner* — Hanh N Nguyen

(74) *Attorney, Agent, or Firm* — Osha Bergman Watanabe & Burton LLP

(57) ABSTRACT

A user terminal according to the present invention includes: a transmitting section that transmits Uplink Control Information (UCI) including at least one of retransmission control information for a downlink data channel, a Scheduling Request (SR) and Channel State Information (CSI); and a control section that controls the transmission of the UCI when a first uplink control channel and a second uplink control channel having a longer duration than that of the first uplink control channel are subjected to time division multiplexing in one or more slots.

5 Claims, 17 Drawing Sheets

(56) References Cited

U.S. PATENT DOCUMENTS

| | | | | |
|---|---|---|---|---|
| 2019/0372721 | A1* | 12/2019 | Lee | H04L 1/1854 |
| 2020/0235865 | A1* | 7/2020 | Takeda | H04L 1/1854 |
| 2021/0045143 | A1* | 2/2021 | Ji | H04W 72/1284 |
| 2021/0144763 | A1* | 5/2021 | Park | H04W 72/0446 |
| 2021/0160901 | A1* | 5/2021 | Takeda | H04W 72/1284 |

OTHER PUBLICATIONS

3GPP TSG RAN WG1 Meeting 90bis; R1-1717962 "Considerations on UCI and UL channel multiplexing for NR" LG Electronics; Prague, CZ; Oct. 9-13, 2017 (14 pages).

3GPP TSG RAN WG1 Meeting #90; R1-1713336 "PUCCH and PUSCH simultaneous transmission and multiplexing" Sharp; Prague, Czech Republic; Aug. 21-25, 2017 (3 pages).

Extended European Search Report issued in European Application No. 17930072.8, dated May 19, 2021 (9 pages).

International Search Report issued in PCT/JP2017/038219 dated Jan. 16, 2018 (1 page).

Written Opinion of the International Searching Authority issued in PCT/JP2017/038219 dated Jan. 16, 2018 (4 pages).

Huawei, HiSilicon; "Handling collisions of sTTI/TTI in UL"; 3GPP TSG RAN WG1 Meeting #88, R1-1701741; Athens, Greece; Feb. 13-17, 2017 (10 pages).

Huawei, HiSilicon; "Multiplexing between PUCCHs"; 3GPP TSG RAN WG1 Meeting #90, R1-1714331; Prague, Czech Republic; Aug. 21-25, 2017 (3 pages).

CATT; "PUCCH resource allocation"; 3GPP TSG RAN WG1 Meeting #89, R1-1707505; Hangzhou, P.R. China; May 15-19, 2017 (5 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in counterpart Indonesian Application No. P00202003615 dated Jul. 27, 2021 (10 pages).

Office Action issued in Indian Application No. 202037019348 dated Mar. 10, 2022 (7 pages).

Notice of Reasons for Refusal issued in Japanese Application No. 2019-549694 dated Dec. 21, 2021 (6 pages).

Office Action issued in Japanese Application No. 2019-549694; dated Jul. 12, 2022 (9 pages).

Office Action issued in Japanese Application No. 2022-162872; dated Feb. 28, 2023 (7 pages).

Office Action issued in counterpart European Patent Application No. 17930072.8, dated Mar. 14, 2023 (5 pages).

Office Action issued in Chinese Application No. 201780097944.7; dated Jan. 3, 2023 (17 pages).

Office Action issued in Japanese Application No. 2022-162872 dated May 16, 2023 (6 pages).

* cited by examiner

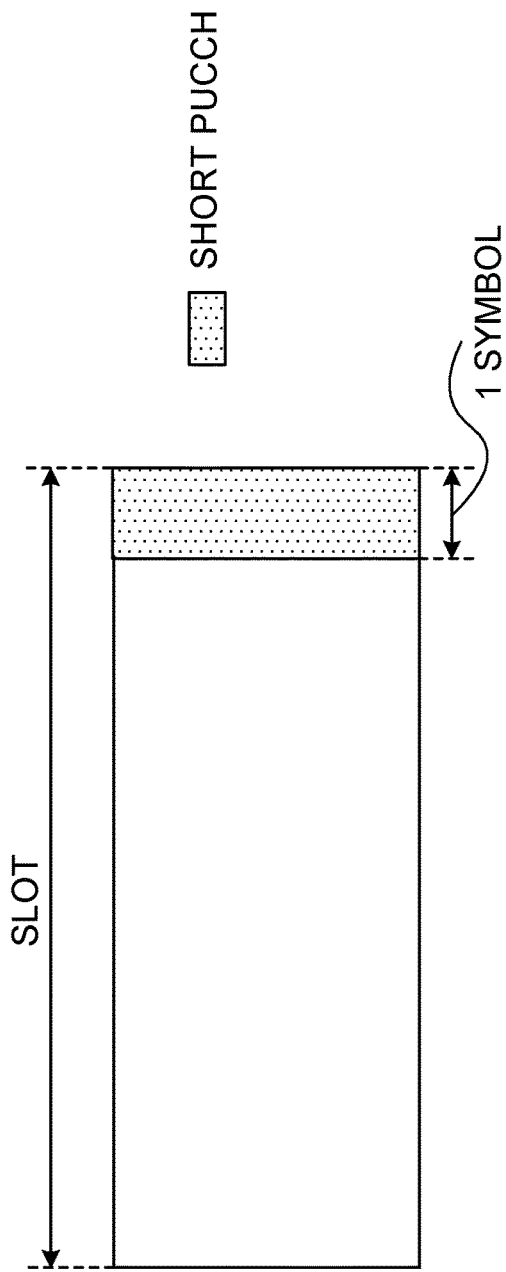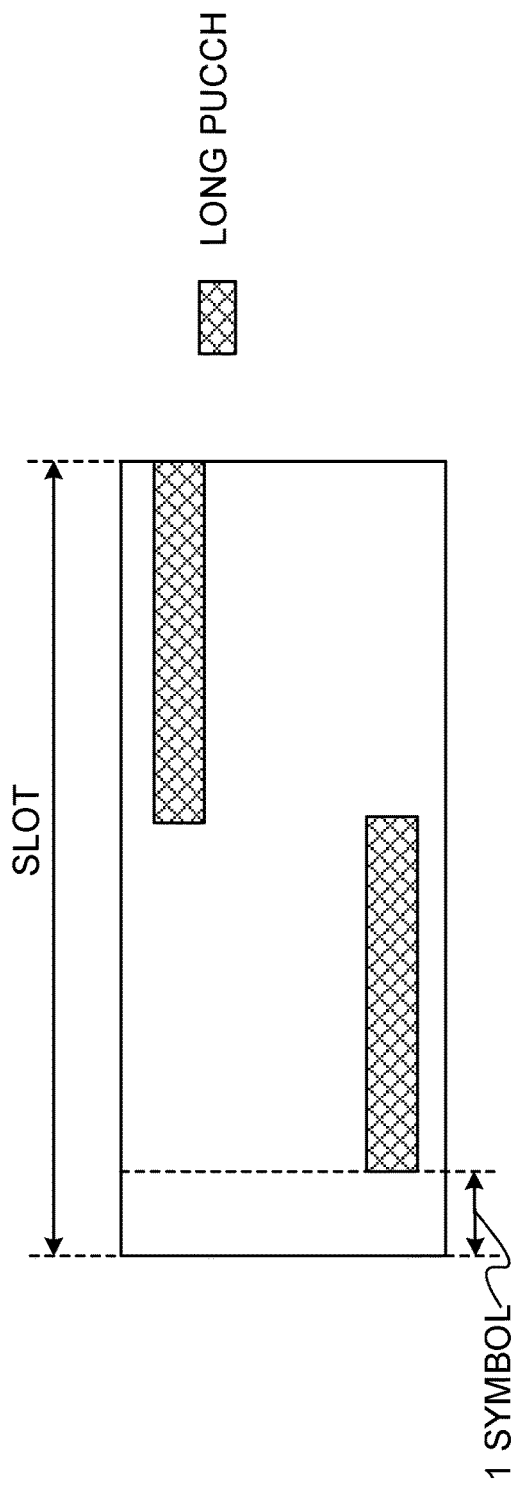

| PUCCH FORMAT | NUMBER OF SYMBOLS IN SLOT | NUMBER OF BITS | Pre-DFT OCC |
|---|---|---|---|
| 0 | 1-2 | ≤1 | N.A. |
| 1 | 4-14 | ≤2 | N.A. |
| 2 | 1-2 | >2 | N.A. |
| 3 | 4-14 | >2 | No |
| 4 | 4-14 | >2 | Yes |

FIG. 2

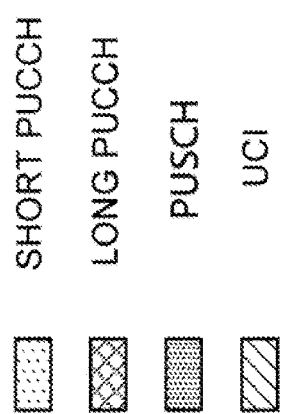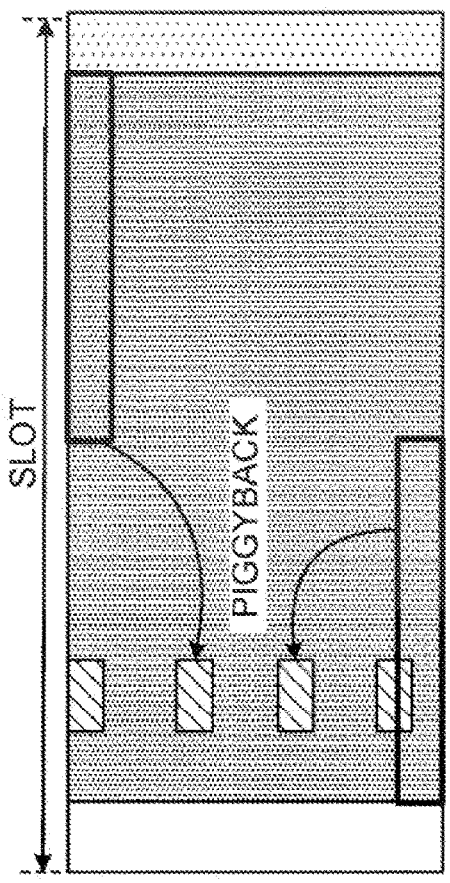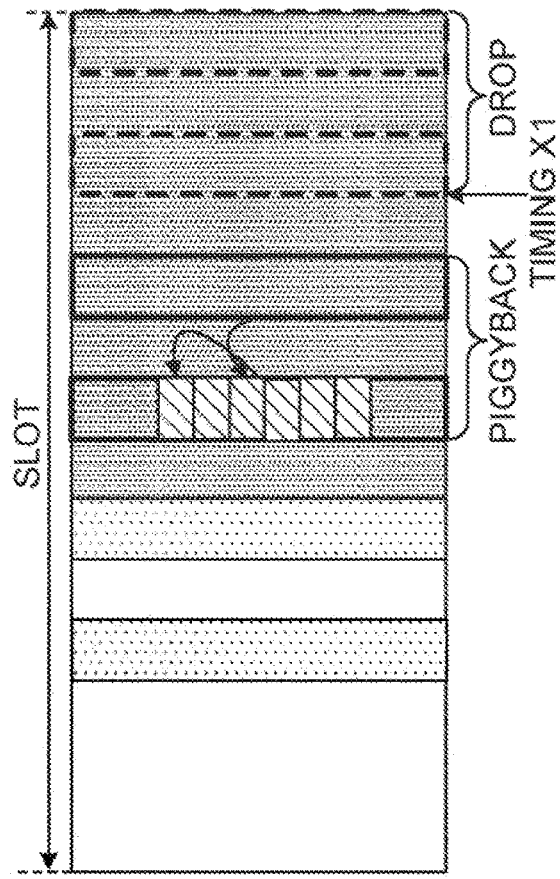
FIG. 11A
FIG. 11B

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as LTE-Advanced (LTE-A), Future Radio Access (FRA), 4G, 5G 5G+ (plus), New RAT (NR), or LTE Rel. 14, 15 and ~) have been also studied.

Furthermore, legacy LTE systems (e.g., LTE Rel. 8 to 13) perform communication on Downlink (DL) and/or Uplink (UL) by using a subframe (also referred to as a Transmission Time Intervals (TTI)) of 1 ms. The subframe is a transmission time unit of 1 channel-coded data packet, and is a processing unit of scheduling, link adaptation or retransmission control (HARQ: Hybrid Automatic Repeat reQuest).

Furthermore, according to legacy LTE systems (e.g., LTE Rel. 8 to 13), a user terminal transmits Uplink Control Information (UCI) by using an uplink control channel (e.g., a PUCCH: Physical Uplink Control Channel) or an uplink data channel (e.g., a PUSCH: Physical Uplink Shared Channel). A configuration (format) of the uplink control channel will be referred to as a PUCCH format (PF).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Legacy LTE systems (e.g., LTE Rel. 13 and prior releases) support uplink control channels (e.g., LTE PUCCH formats 1 to 5) of a plurality of formats of an identical duration (e.g., 14 symbols in a case of general Cyclic Prefix (CP)). On the other hand, future radio communication systems (e.g., LTE Rel. 14, 15 and ~, 5G and NR) are assumed to support uplink control channels of a plurality of formats whose durations are at least different.

For example, it has been studied for the future radio communication systems to support a first uplink control channel (also referred to as a short PUCCH or NR PUCCH formats 0 and/or 2) of a relatively short duration (e.g., 1 to 2 symbols), and a second uplink control channel (also referred to as a long PUCCH or at least one of NR PUCCH formats 1, 3 and 4 below) having a longer duration (e.g., 4 to 14 symbols) than that of the first uplink control channel.

Thus, it is assumed that, when the uplink control channels of a plurality of formats whose durations are at least different are supported, transmission control of UCI in the legacy LTE systems (e.g., LTE Rel. 13 or prior releases) that support only a plurality of uplink control channels of the identical duration is not suitable.

The present invention has been made in light of this point, and one of objects of the present invention is to provide a user terminal and a radio communication method that can appropriately control transmission of UCI when uplink control channels of a plurality of formats whose durations are at least different are supported.

Solution to Problem

One aspect of a user terminal according to the present invention includes: a transmitting section that transmits Uplink Control Information (UCI) including at least one of retransmission control information for a downlink data channel, a Scheduling Request (SR) and Channel State Information (CSI); and a control section that controls the transmission of the UCI when a first uplink control channel and a second uplink control channel having a longer duration than that of the first uplink control channel are subjected to time division multiplexing in one or more slots.

Advantageous Effects of Invention

According to the present invention, it is possible to appropriately control transmission of UCI when uplink control channels of a plurality of formats whose durations are at least different are supported.

BRIEF DESCRIPTION OF DRAWINGS

FIGS. 1A and 1B are diagrams illustrating a configuration example of an uplink control channel in a future radio communication system.

FIG. 2 is a diagram illustrating one example of a PUCCH format in the future radio communication system.

FIGS. 11A and 11B are diagrams illustrating one example of piggyback of UCI to a PUSCH according to an eighth aspect.

DESCRIPTION OF EMBODIMENTS

Figure 3:
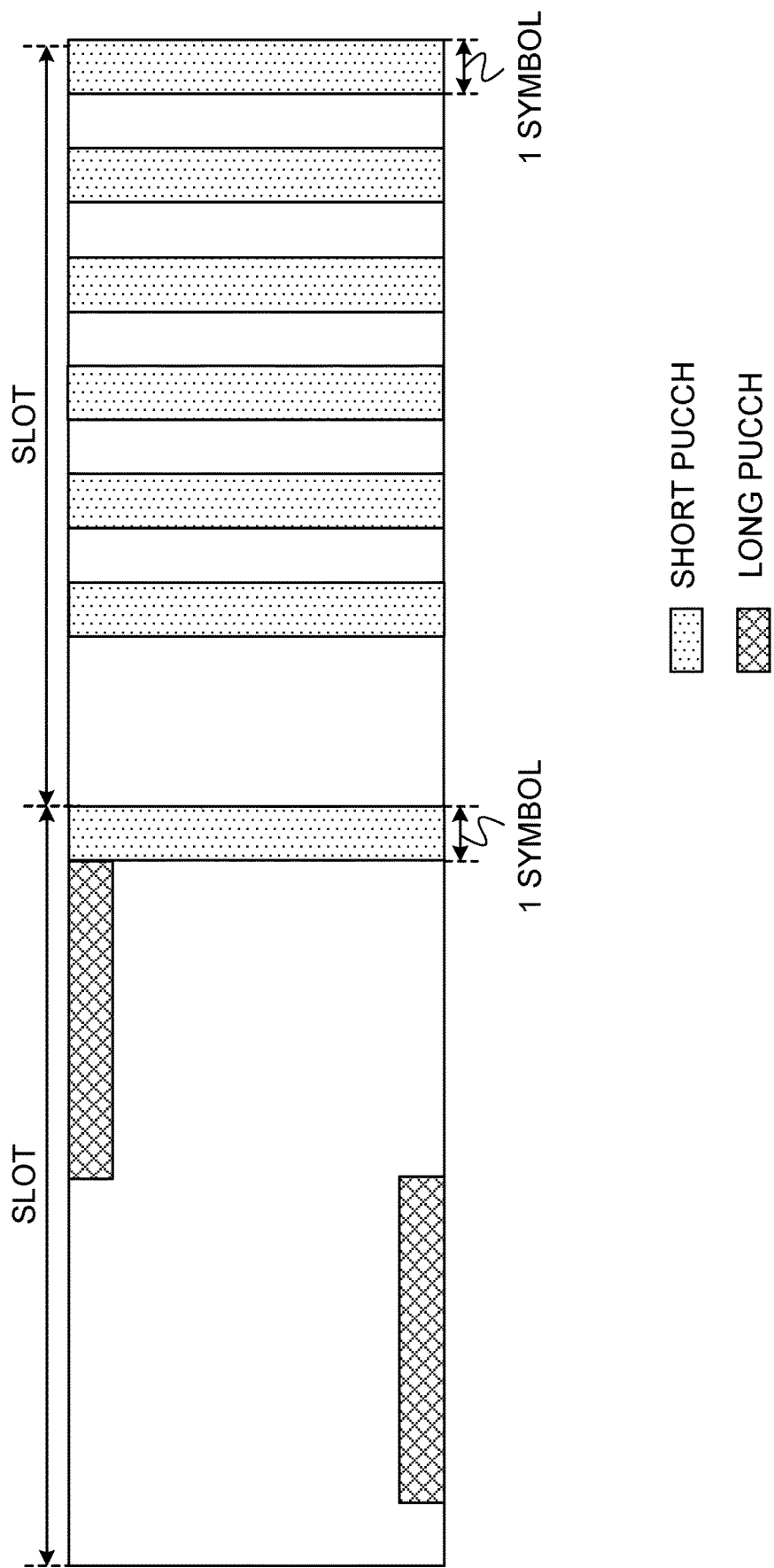
FIG. 3 is a diagram illustrating one example of time division multiplexing of a short PUCCH and a long PUCCH.

Legacy LTE systems (LTE Rel. 13 or prior releases) support uplink control channels (e.g., PUCCHs) of a plurality of formats (e.g., LTE PUCCH formats (LTE PFs) 1 to 5) of an identical duration (e.g., 14 symbols in a case of general Cyclic Prefix (CP)).

It has been studied for future radio communication systems (e.g., LTE Rel. 15 and ~, 5G and NR) to transmit UCI by using uplink control channels (e.g., PUCCHs) of a plurality of formats (e.g., NR PUCCH formats (NR PFs) that will be referred to simply as PUCCH formats) whose durations are at least different.

FIG. 1 is a diagram illustrating one example of a PUCCH in the future radio communication system. FIG. 1A illustrates a PUCCH (a short PUCCH or a first uplink control channel) including a relatively small number of symbols (a duration such as 1 to 2 symbols). FIG. 1B illustrates a PUCCH (a long PUCCH or a second uplink control channel) including a larger number of symbols (a duration such as 4 to 14 symbols) than that of the short PUCCH.

As illustrated in FIG. 1A, the short PUCCH may be arranged on a given number of symbols (e.g., 1 to 2 symbols) from a last of a slot. In addition, the arranged symbols of the short PUCCH are not limited to the last of the slot, and may be a given number of symbols at a start or a middle of the slot. Furthermore, the short PUCCH is arranged on one or more frequency resources (e.g., one or more PRBs). In addition, in FIG. 1A, the short PUCCH is arranged in contiguous PRBs, yet may be arranged in non-contiguous PRBs.

Furthermore, the short PUCCH may be subjected to time division multiplexing and/or frequency division multiplexing with an uplink data channel (also referred to as a PUSCH below) in a slot. Furthermore, the short PUCCH may be subjected to time division multiplexing and/or frequency division multiplexing with a downlink data channel (also referred to as a PDSCH below) and/or a downlink control channel (also referred to as a PDCCH: Physical Downlink Control Channel below) in the slot.

For the short PUCCH, a multicarrier waveform (e.g., Orthogonal Frequency Division Multiplexing (OFDM) waveform) may be used, or a single carrier waveform (e.g., a Discrete Fourier Transform-Spread-Orthogonal Frequency Division Multiplexing (DFT-s-OFDM) waveform) may be used.

On the other hand, as illustrated in FIG. 1B, a long PUCCH is arranged over the larger number of symbols (e.g., 4 to 14 symbols) than that of the short PUCCH. In FIG. 1B, the long PUCCH is not arranged on a given number of symbols at the start of the slot, yet may be arranged on a given number of symbols at the start of the slot.

As illustrated in FIG. 1B, the long PUCCH may include a smaller number of frequency resources (e.g., one or two PRBs) than that of the short PUCCH or may include an equal number of frequency resources to that of the short PUCCH to obtain a power boosting effect.

Furthermore, the long PUCCH may be subjected to frequency division multiplexing with the PUSCH in the slot. Furthermore, the long PUCCH may be subjected to time division multiplexing with the PDSCH in the slot. Furthermore, the long PUCCH may be arranged in a slot identical to that of the short PUCCH. For the long PUCCH, the single carrier waveform (e.g., DFT-s-OFDM waveform) may be used, or a multicarrier waveform (e.g., OFDM waveform) may be used.

Furthermore, as illustrated in FIG. 1B, the long PUCCH may be applied frequency hopping per given duration (e.g., mini (sub) slot) in the slot. The frequency hopping may be performed at a timing (e.g., 7 symbols in a case of 14 symbols per slot) at which the number of symbols to be transmitted before and after frequency hopping becomes equal, or at a timing (e.g., 6 symbols of a first half and 8 symbols of a second half in a case of 14 symbols per slot) at which the number of symbols before and after frequency hopping becomes unequal.

FIG. 2 is a diagram illustrating one example of PUCCH formats of the future radio communication system. FIG. 2 illustrates a plurality of PUCCH formats (NR PUCCH formats) of different numbers of symbols and/or different numbers of bits of UCI. In addition, the PUCCH formats illustrated in FIG. 2 are only exemplary, and contents and numbers of PUCCH formats 0 to 4 are not limited to those illustrated in FIG. 2.

In, for example, FIG. 2, the PUCCH format 0 is a short PUCCH for UCI up to 2 bits (e.g., FIG. 1A), and will be also referred to as a sequence-based short PUCCH. The short PUCCH conveys the UCI (e.g., HARQ-ACK and/or a Scheduling Request (SR)) up to 2 bits in 1 or 2 symbols.

The PUCCH format 1 is a long PUCCH for the UCI up to 2 bits (e.g., FIG. 1B). The long PUCCH conveys the UCI up to 2 bits in 4 to 14 symbols. According to the PUCCH format 1, a plurality of user terminals may be subjected to Code Division Multiplexing (CDM) in an identical PRB by time-domain block-wise spreading that uses, for example, a Cyclic Shift (CS) and/or an Orthogonal Cover Code (OCC).

The PUCCH format 2 is a short PUCCH for the UCI more than 2 bits (e.g., FIG. 1A). The short PUCCH conveys the UCI more than 2 bits in 1 or 2 symbols.

The PUCCH format 3 is a long PUCCH for the UCI more than 2 bits (e.g., FIG. 1B), and a plurality of user terminals can be multiplexed in an identical PRB. The long PUCCH conveys the UCI more than 2 bits in 4 to 14 symbols. According to the PUCCH format 3, a plurality of user terminals may be subjected to code division multiplexing in the identical PRB by the time-domain block-wise spreading that uses a CS and/or an OCC. Alternatively, a plurality of user terminals may be multiplexed by using at least one of (frequency-domain) block-wise spreading before Discrete Fourier Transform (DFT), Frequency Division Multiplexing (FDM) and a comb-shaped sub-carrier (Comb). Furthermore, the PUCCH format 3 may not be applied the OCC before DFT spreading.

The PUCCH format 4 is a long PUCCH for the UCI more than 2 bits (e.g., FIG. 1B), and a single user terminal is multiplexed in an identical PRB. The long PUCCH conveys the UCI more than 2 bits. The PUCCH format 4 may differ from the PUCCH format 3 in that a plurality of user terminals are not multiplexed in the identical PRB. Furthermore, the OCC may be applied to the PUCCH format 4 before DFT spreading.

As described above, the future radio communication systems (e.g., LTE Rel. 15 and ~, 5G and NR) are assumed to support two formats (PFs 0/2 in FIG. 2) for the short PUCCH and three formats (PFs 1/3/4 in FIG. 2) for the long PUCCH.

Furthermore, the short PUCCH and the long PUCCH are assumed to be subjected to Time Division Multiplexing (TDM) in one or more slots (a single or a plurality of slots). Furthermore, the short PUCCH can be arranged in any symbol in the slot, and therefore a plurality of short PUCCHs are assumed to be subjected to time division multiplexing in one or more slots (a single or a plurality of slots).

FIG. 3 is a diagram illustrating one example of time division multiplexing of the short PUCCH and the long PUCCH. As illustrated in FIG. 3, the short PUCCH and the long PUCCH may be subjected to time division multiplexing in a single slot or may be subjected to time division multiplexing in a plurality of slots. Furthermore, a plurality of short PUCCHs may be subjected to time division multiplexing in a single slot.

The user terminal may perform TDM transmission on the long PUCCH and the short PUCCH in an identical slot or may transmit one of the long PUCCH and the short PUCCH. Furthermore, the user terminal may perform TDM transmission on a plurality of short PUCCHs in the identical slot.

Thus, when a plurality of PUCCH formats whose time durations are at least different are subjected to time division multiplexing in one or more slots, a problem is how to control transmission of UCI in the user terminal. Hence, the inventors of this application have studied a method for appropriately controlling transmission of UCI in a case where a plurality of PUCCH formats whose time durations are at least different are subjected to time division multiplexing in one or more slots, and conceived the present invention.

More specifically, the inventors of this application have studied a method for appropriately configuring and/or indicating to the user terminal a PUCCH (or a PUCCH format) used for transmission of specific UCI (e.g., HARQ-ACK for a PDSCH in a specific CC and/or a specific slot, an SR, CSI of a specific CSI process or a specific UCI type) (the first to third aspects).

Furthermore, the inventors of this application have studied a method for appropriately controlling transmission of UCI in a case where a transmission timing of the specific UCI (e.g., HARQ-ACK) overlaps with a PUCCH of another UCI (the fourth to sixth aspects). Furthermore, the inventors of this application have studied a method for controlling a maximum code rate of the UCI (seventh aspect). Furthermore, the inventors of this application have studied a method for appropriately controlling transmission of the UCI in a case where the transmission timing of the UCI overlaps with the PUSCH (the eighth to eleventh aspects).

The present embodiment will be described in detail below. In the present embodiment, the "UCI" may include at least one of a Scheduling Request (SR), retransmission control information (HARQ-ACK: Hybrid Automatic Repeat reQuest-Acknowledge, ACK or NACK (Negative ACK)) for downlink data (downlink data channel (e.g., PDSCH: Physical Downlink Shared Channel)), Channel State Information (CSI) and beam related information (e.g., BI: Beam Index).

Furthermore, in the present embodiment, the "short PUCCH (first uplink control channel)" is a general term of the PUCCH formats 0 and 2 illustrated in FIG. 2, and the "long PUCCH (second uplink control channel)" is a general term of the PUCCH formats 1, 3 and 4 illustrated in FIG. 2. In addition, configurations of the short PUCCH and the long PUCCH are not limited to the PUCCH formats illustrated in FIG. 2, and may be changed, added or deleted as appropriate. Furthermore, numbers of the PUCCH formats respectively indicating the long PUCCH and the short PUCCH are not limited to those illustrated in FIG. 2, either.

(First Aspect)

The first aspect will describe determination of a PUCCH used for transmission of HARQ-ACK (UCI that includes HARQ-ACK and does not include an SR and CSI). A user terminal may determine the PUCCH used for transmission of HARQ-ACK based on DCI (DL assignment) used for scheduling of a PDSCH (downlink data channel) or scheduling of the PDSCH.

<First Determination Example of PUCCH for HARQ-ACK>

According to the first determination example, the user terminal determines the PUCCH used for transmission of HARQ-ACK of a PDSCH based on a value of a given field in the DCI for scheduling the PDSCH. The given field may be paraphrased as a given Information Element (IE) or a given index.

According to the first determination example, the DCI for scheduling the PDSCH may explicitly or implicitly indicate which PUCCH (or which PUCCH format) the HARQ-ACK for the PDSCH is multiplexed with.

More specifically, (1) the DCI may include a given field indicating one of PUCCHs as part of a PUCCH resource. In this regard, the PUCCH resource is a resource specified in at least one of a time-domain, a frequency-domain and a code-domain. Each PUCCH resource may be associated with the PUCCH format. In this case, the PUCCH format can be also switched concurrently by switching the PUCCH resource, so that it is possible to more flexibly control the PUCCH. Furthermore, each PUCCH resource may be associated with an other parameter group related to PUCCH transmission such as a maximum code rate (Max code rate) and a transmission power parameter.

Configuration information indicating one or more PUCCH resources is configured to the user terminal by higher layer signaling (e.g., RRC signaling), and the given field value of the DCI indicates one of the one or more PUCCH resources. The user terminal may determine a PUCCH format used for transmission of HARQ-ACK based on the PUCCH resource indicated by the given field value.

Alternatively, (2) the DCI may include a given field value indicating a transmission timing (an HARQ-ACK timing or a feedback timing) of HARQ-ACK. The user terminal may determine a PUCCH format used for transmission of HARQ-ACK at an HARQ-ACK timing indicated by the given field value.

Figure 4:
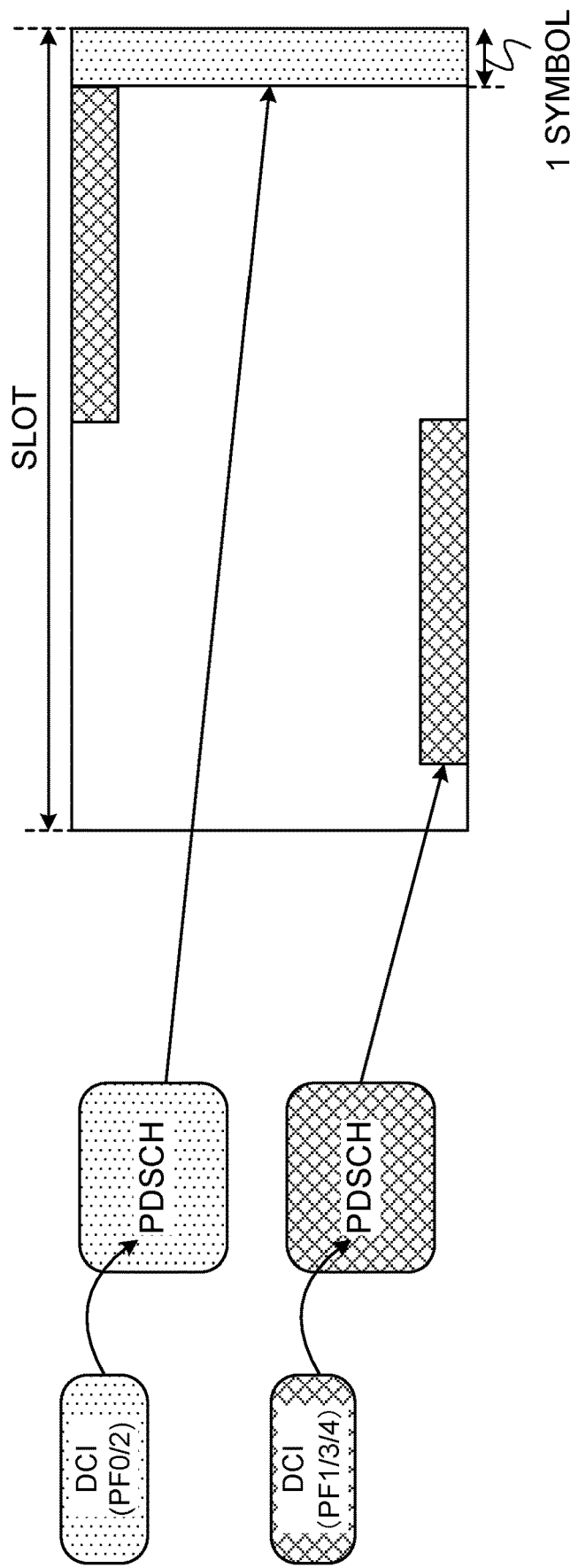
FIG. 4 is a diagram illustrating a first determination example of a PUCCH for HARQ-ACK according to a first aspect.

FIG. 4 is a diagram illustrating the first determination example of the PUCCH for HARQ-ACK according to the first aspect. In, for example, FIG. 4, the given field value (e.g., (1) the field value indicating the PUCCH resource or (2) the field value indicating an HARQ-ACK timing) in DCI for scheduling each PDSCH indicates a PUCCH format used for transmission of HARQ-ACK.

The user terminal transmits HARQ-ACK for the PDSCH scheduled by the DCI by using the PUCCHs (the short PUCCH and the long PUCCH in this case) determined based on the given field value in the DCI.

<Second Determination Example of PUCCH for HARQ-ACK>

According to the second determination example, the user terminal determines a PUCCH used for transmission of HARQ-ACK of a PDSCH based on a type of DCI for scheduling the PDSCH. The type of the DCI may be paraphrased as a DCI format, a DCI size or a DCI type.

According to the second determination example, the user terminal may be notified of information indicating an association between the DCI type and a PUCCH (or a PUCCH format) by higher layer signaling. In addition, the association may be fixedly defined by a specification.

For example, (1) DCI for scheduling a PDSCH of a Primary Cell (PCell) may be associated with a certain PUCCH (e.g., long PUCCH), and DCI for scheduling a PDSCH of a Secondary Cell (SCell) may be associated with another PUCCH (e.g., short PUCCH).

Alternatively, (2) DCI detected in a search space (Common Search Space (CSS)) that is common between one or more user terminals may be associated with a certain PUCCH (e.g., long PUCCH), and DCI detected in a search space (UE-specific Search Space (UE-SS)) that is specific to the user terminal may be associated with another PUCCH (e.g., short PUCCH).

Figure 5:
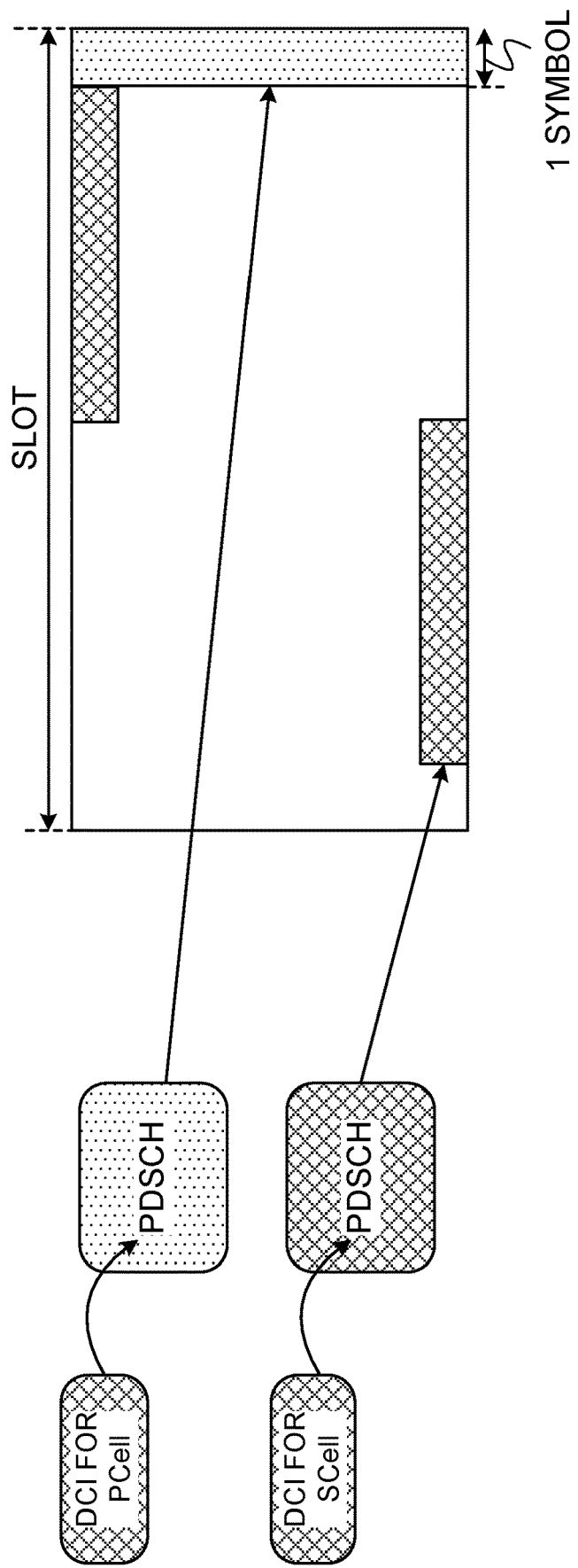
FIG. 5 is a diagram illustrating a second determination example of the PUCCH for HARQ-ACK according to the first aspect.

FIG. 5 is a diagram illustrating the second determination example of the PUCCH for HARQ-ACK according to the first aspect. In, for example, in FIG. 5, a type of DCI (for the PCell or for the SCell) for scheduling each PDSCH indicates a PUCCH format used for transmission of HARQ-ACK.

The user terminal transmits HARQ-ACK for the PDSCH scheduled by the DCI by using the PUCCHs (the short PUCCH and the long PUCCH) determined based on the DCI type.

<Third Determination Example of PUCCH for HARQ-ACK>

According to the third determination example, the user terminal determines a PUCCH used for transmission of HARQ-ACK of a PDSCH based on scheduling of the PDSCH. More specifically, the user terminal determines the above PUCCH based on whether or not scheduling is performed on a slot basis.

According to the third determination example, when the PDSCH is scheduled on the slot basis, the HARQ-ACK for the PDSCH may be transmitted on a certain PUCCH (e.g., long PUCCH). On the other hand, when the PDSCH is scheduled on a non-slot basis (on a mini slot basis), the HARQ-ACK for the PDSCH may be transmitted on another PUCCH (e.g., short PUCCH).

Figure 6:
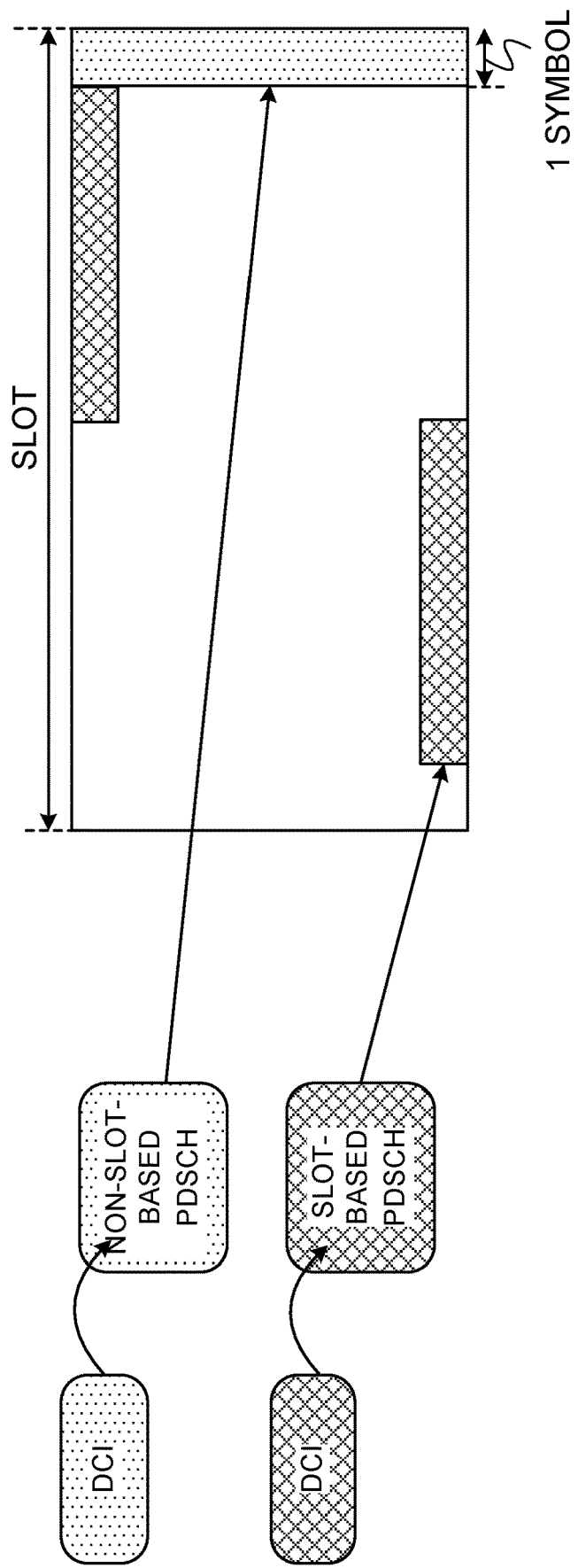
FIG. 6 is a diagram illustrating a third determination example of the PUCCH for HARQ-ACK according to the first aspect.

FIG. 6 is a diagram illustrating the third determination example of the PUCCH for HARQ-ACK according to the first aspect. In, for example, FIG. 6, a type of scheduling (on the non-slot basis or on the slot basis in this case) of each PDSCH indicates a PUCCH format used for transmission of HARQ-ACK.

The user terminal transmits the HARQ-ACK for the PDSCH by using the PUCCHs (the short PUCCH and the long PUCCH in this case) determined based on whether or not the PDSCH is scheduled on the slot basis.

In addition, in FIG. 6, when at least part of the short PUCCH and the long PUCCH overlap (collide), the short PUCCH may be transmitted and the long PUCCH may be dropped.

According to the first aspect, a PUCCH used for transmission of HARQ-ACK is determined based on DCI (DL assignment) used for scheduling of a PDSCH or scheduling of the PDSCH, so that it is possible to dynamically control the PUCCH for HARQ-ACK.

(Second Aspect)

The second aspect will describe determination of a PUCCH used for transmission of an SR (UCI that includes the SR and does not include HARQ-ACK and CSI). The user terminal may determine the PUCCH used for transmission of the SR based on higher layer signaling.

Each SR may be associated with a PUCCH format and/or a duration (a length such as a long or short duration) by higher layer signaling (RRC signaling).

Figure 7A:
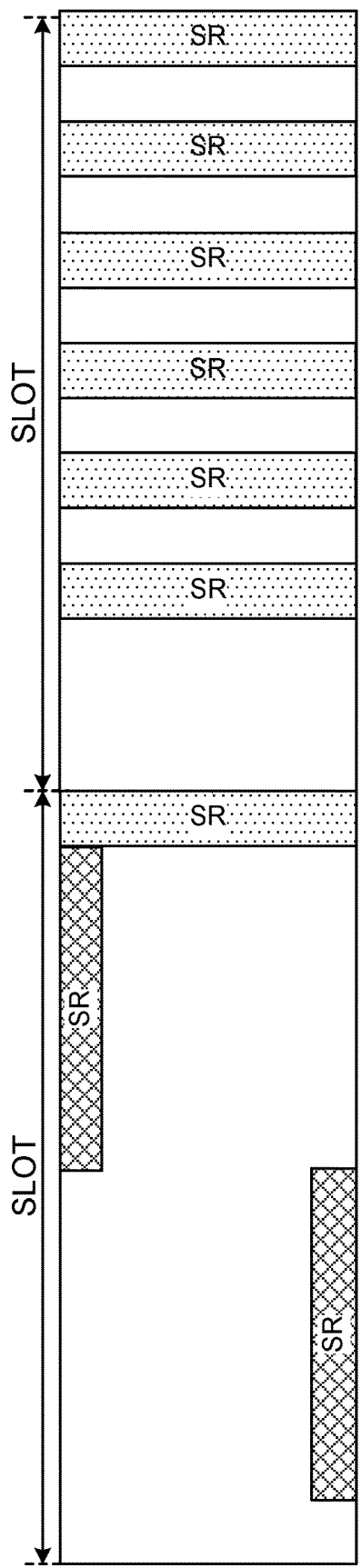
FIGS. 7A and 7B are diagrams illustrating one example of configurations of a plurality of SRs according to a second aspect.
Figure 7B:
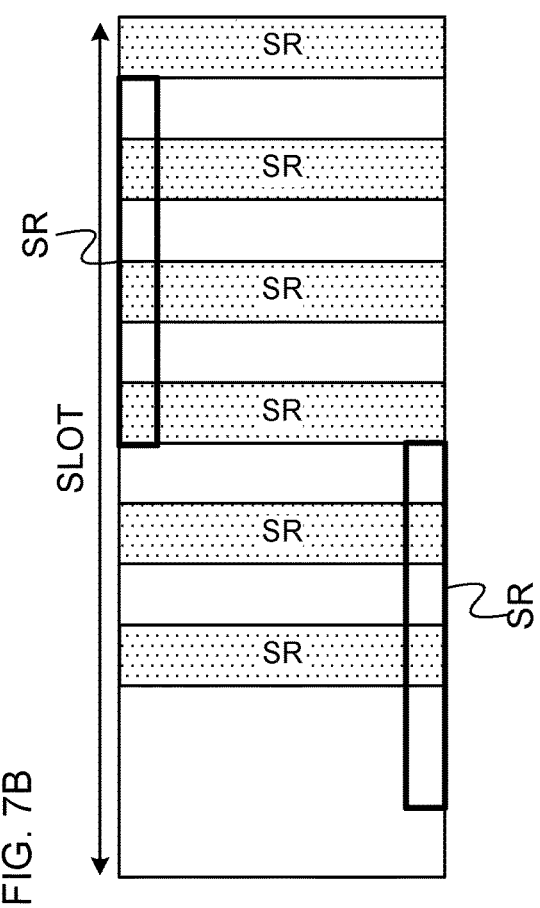

FIG. 7 is a diagram illustrating one example of configurations of a plurality of SRs according to the second aspect. When there are the configurations of a plurality of SRs, a plurality of PUCCHs respectively associated with a plurality of SRs may be subjected to time division multiplexing and configured as illustrated in FIG. 7A. Furthermore, as illustrated in FIG. 7B, at least two of a plurality of PUCCHs respectively associated with a plurality of SRs may be configured overlapping each other.

When a PUCCH (a PUCCH resource or an SR resource) of each of a plurality of SRs is configured as illustrated in FIGS. 7A and 7B, the user terminal may transmit the SR by using any configured PUCCH.

In, for example, FIG. 7B, the user terminal may transmit the SR by using a long PUCCH when a traffic occurs in a previous slot, or transmit the SR by using a short PUCCH when the traffic occurs in a current slot. The short PUCCH may be the earliest short PUCCH from a time of the occurrence of the traffic among one or more short PUCCHs configured in a slot, or may be a short PUCCH defined according to a traffic type (e.g., a URLLC: Ultra Reliable and Low Latency Communications, an eMBB: enhanced Mobile Broad Band or eMTC: enhanced Machine Type Communication).

According to the second aspect, the PUCCH used for transmission of the SR is determined based on higher layer signaling, so that it is possible to semi-persistently control the PUCCH for the SR.

(Third Aspect)

The third aspect will describe determination of a PUCCH used for transmission of CSI (UCI that includes the CSI and does not include HARQ-ACK and an SR). A user terminal may determine the PUCCH used for transmission of the CSI based on DCI including trigger information of CSI reporting or higher layer signaling.

<Aperiodic CSI>

When Aperiodic CSI (A-CSI) is fed back by using the PUCCH, DCI for triggering the aperiodic CSI may explicitly or implicitly indicate which PUCCH (or which PUCCH format) the A-CSI is multiplexed with.

More specifically, (1) the DCI may include a given field indicating one of PUCCHs as part of the above PUCCH resource. One or more PUCCH resources are configured to the user terminal by higher layer signaling, and the given field value of the DCI indicates one of the one or more PUCCH resources. The user terminal may determine a PUCCH format used for transmission of the A-CSI by the PUCCH resource indicated by the given field value.

Alternatively, (2) the DCI may include a given field indicating a transmission timing (feedback timing) of the A-CSI. The user terminal may determine the PUCCH format used for transmission of the A-CSI at the transmission timing indicated by the given field value.

<Periodic CSI>

When Periodic CSI (P-CSI) is fed back by using the PUCCH, the user terminal may determine a PUCCH used for transmission of the P-CSI based on higher layer signaling.

The user terminal may notify information indicating an association between the P-CSI and the PUCCH format by higher layer signaling. The user terminal may determine the PUCCH format used for transmission of the P-CSI based on the information.

<Semi-Persistent CSI>

When Semi-Persistent CSI (SP-CSI) is fed back by using the PUCCH, DCI for triggering the semi-persistent CSI may explicitly or implicitly indicate which PUCCH (or which PUCCH format) the SP-CSI is multiplexed with.

More specifically, (1) the DCI may include a given field indicating one of PUCCHs as part of the above PUCCH resource. One or more PUCCH resources are configured to the user terminal by higher layer signaling, and the given field value of the DCI indicates one of the one or more PUCCH resources. The user terminal may determine the PUCCH format used for transmission of the SP-CSI by the PUCCH resource indicated by the given field value.

Alternatively, (2) the DCI may include a given field indicating a transmission timing (feedback timing) of the SP-CSI. The user terminal may determine the PUCCH format used for transmission of the SP-CSI at the transmission timing indicated by the given field value.

According to the third aspect, the user terminal determines a PUCCH used for transmission of CSI (A-CSI, P-CSI or SP-CSI) based on DCI including trigger information of CSI reporting or higher layer signaling, so that it is possible to dynamically or semi-persistently control the PUCCH used for transmission of the CSI.

(Fourth Aspect)

The fourth aspect will describe transmission control of HARQ-ACK and an SR that uses a PUCCH. FIG. 8 is a diagram illustrating one example of transmission control of the HARQ-ACK and the SR according to the fourth aspect. In addition, FIG. 8 illustrates a short PUCCH for HARQ-ACK and a long PUCCH for the SR. However, the PUCCHs used for HARQ-ACK and the SR are not limited to those illustrated in FIG. 8.

Figure 8A:
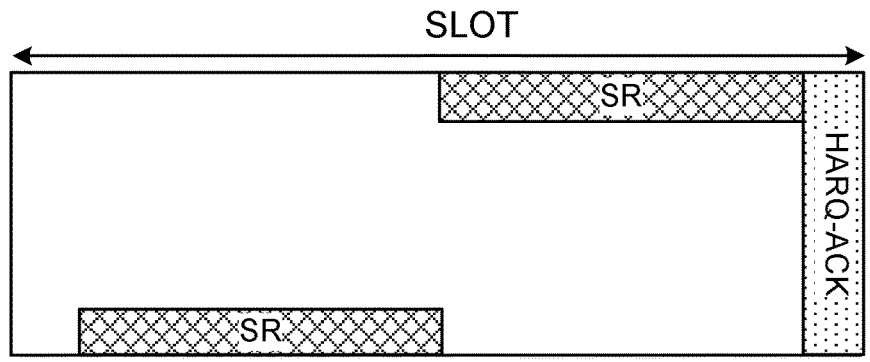
FIGS. 8A to 8D are diagrams illustrating one example of transmission control of HARQ-ACK and an SR according to a fourth aspect.

When a transmission timing of the HARQ-ACK does not overlap with the PUCCH for the SR as illustrated in FIG. 8A, a user terminal may perform time division multiplexing on and transmit the PUCCH for the HARQ-ACK (e.g., short PUCCH) and the PUCCH for the SR (e.g., long PUCCH).

Figure 8B:
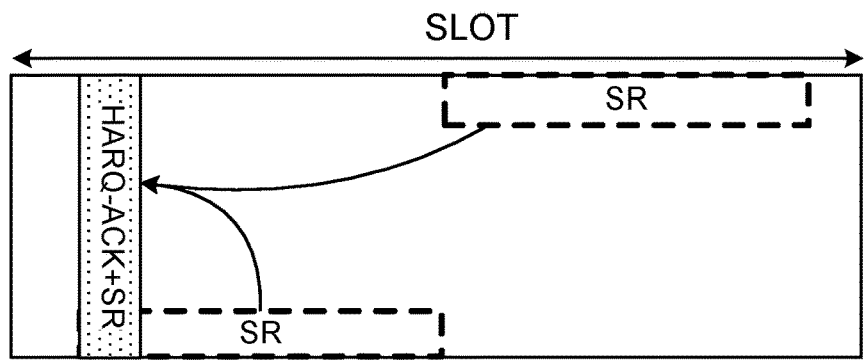
Figure 8C:
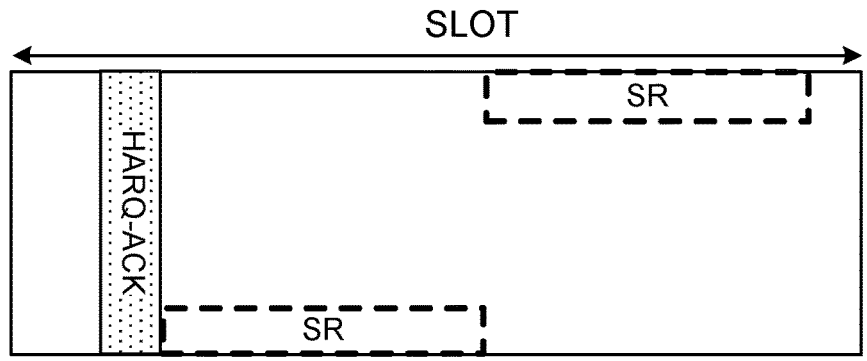
Figure 8D:
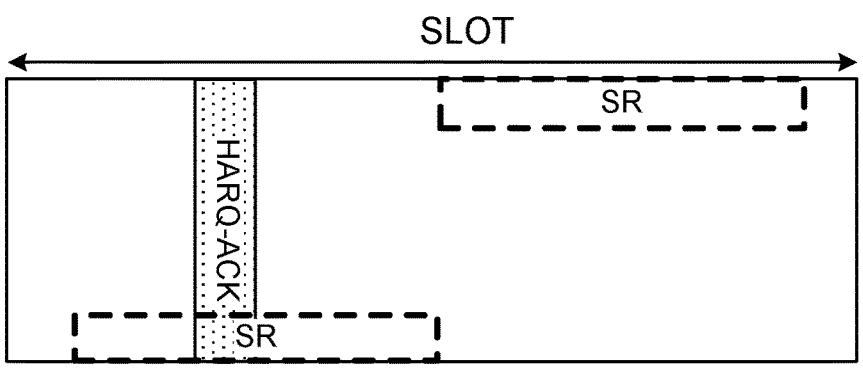

When the transmission timing of the HARQ-ACK and the PUCCH for the SR overlap as illustrated in FIGS. 8B to 8D, the user terminal may control transmission of the HARQ-ACK and the SR based on a timing at which the PUCCH for the HARQ-ACK starts.

When the PUCCH for the HARQ-ACK (e.g., short PUCCH) starts at a timing identical to the PUCCH for the SR (e.g., long PUCCH) as illustrated in FIG. 8B, the user terminal may multiplex and transmit the HARQ-ACK and the SR on an identical channel (e.g., short PUCCH). In this case, the user terminal may fall back the PUCCH format to a PUCCH format of a larger payload (e.g., PF 0=>2).

When the PUCCH for the HARQ-ACK (e.g., short PUCCH) starts before the PUCCH for the SR (e.g., long PUCCH) starts as illustrated in FIG. 8C, the user terminal may transmit the HARQ-ACK by using the PUCCH for the HARQ-ACK (e.g., short PUCCH), and make transmission of the SR pend. Alternatively, both of the PUCCHs do not overlap in this case similar to FIG. 8A, and therefore the user terminal may perform time division multiplexing on and transmit the PUCCH for the HARQ-ACK (e.g., short PUCCH) and the PUCCH for the SR (e.g., long PUCCH).

Alternatively, in FIG. 8C, the user terminal may transmit both of the HARQ-ACK and the SR. When, for example, the HARQ-ACK is up to 2 bits, the user terminal may transmit the HARQ-ACK by using the PUCCH for the SR (an SR resource such as a long PUCCH) when the SR is 1 (positive), and transmit the HARQ-ACK by using the PUCCH for the HARQ-ACK (an HARQ-ACK resource such as the short PUCCH) when the SR is 0 (negative). Consequently, the user terminal can implicitly notify the radio base station of the SR.

Furthermore, when the HARQ-ACK exceeds two bits in FIG. 8C, the user terminal may joint and encode (joint-encode) the SR and the HARQ-ACK to transmit by using the PUCCH for the HARQ-ACK.

When the PUCCH for the HARQ-ACK (e.g., short PUCCH) starts after the PUCCH for the SR (e.g., long PUCCH) as illustrated in FIG. 8D, the user terminal may drop or cancel the SR before starting transmitting the PUCCH for the HARQ-ACK (e.g., short PUCCH), and transmit the HARQ-ACK by using the PUCCH for the HARQ-ACK.

Alternatively, similar to FIG. 8C, the user terminal may explicitly transmit the HARQ-ACK by using the PUCCH for the HARQ-ACK and the PUCCH for the SR, and implicitly transmit the SR. Furthermore, the user terminal may joint-encode the HARQ-ACK and the SR to transmit by using the PUCCH for the HARQ-ACK.

According to the fourth aspect, when a transmission timing of the HARQ-ACK overlaps with the PUCCH for the SR, it is possible to appropriately control transmission of the HARQ-ACK and the SR based on a timing at which the PUCCH for the HARQ-ACK starts.

(Fifth Aspect)

The fifth aspect will describe transmission control of HARQ-ACK and CSI that uses a PUCCH. FIG. 9 is a diagram illustrating one example of the transmission control of the HARQ-ACK and the CSI according to the fifth aspect. In addition, FIG. 9 illustrates a short PUCCH for the HARQ-ACK and a long PUCCH for the CSI. However, the PUCCHs used for the HARQ-ACK and the CSI are not limited to those illustrated in FIG. 9.

Figure 9A:
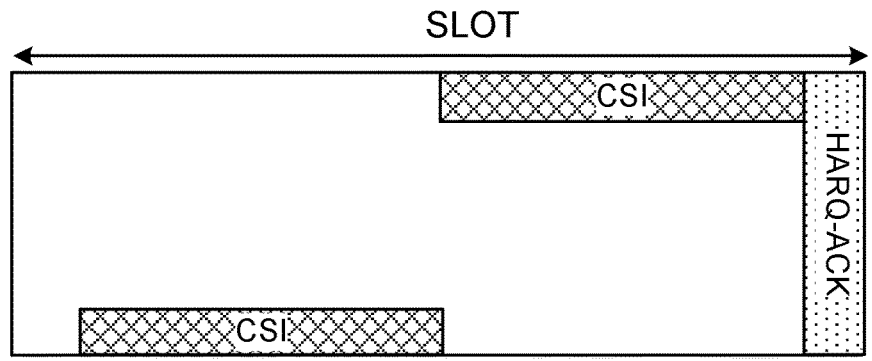
FIGS. 9A to 9D are diagrams illustrating one example of transmission control of HARQ-ACK and an SR according to a fifth aspect.

When a transmission timing of the HARQ-ACK does not overlap with the PUCCH for the CSI as illustrated in FIG. 9A, the user terminal may perform time division multiplexing on and transmit the PUCCH for the HARQ-ACK (e.g., short PUCCH) and the PUCCH for the CSI (e.g., long PUCCH).

Figure 9B:
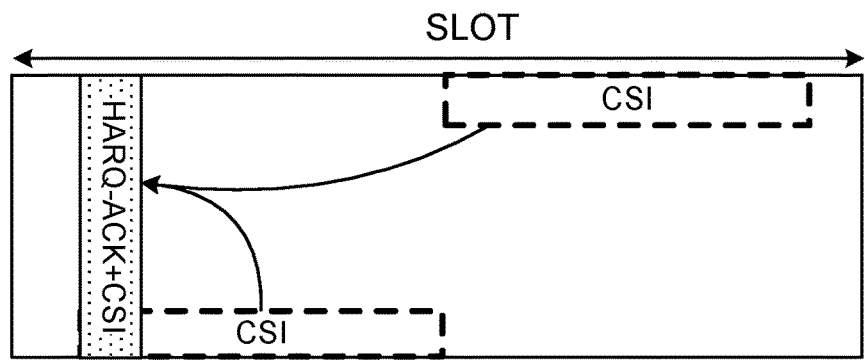
Figure 9C:
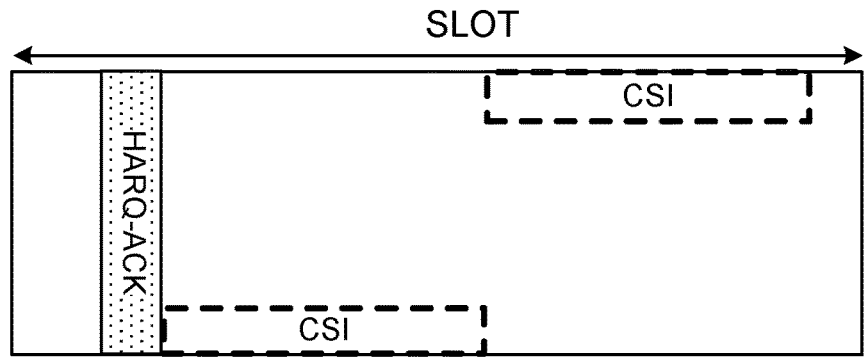
Figure 9D:
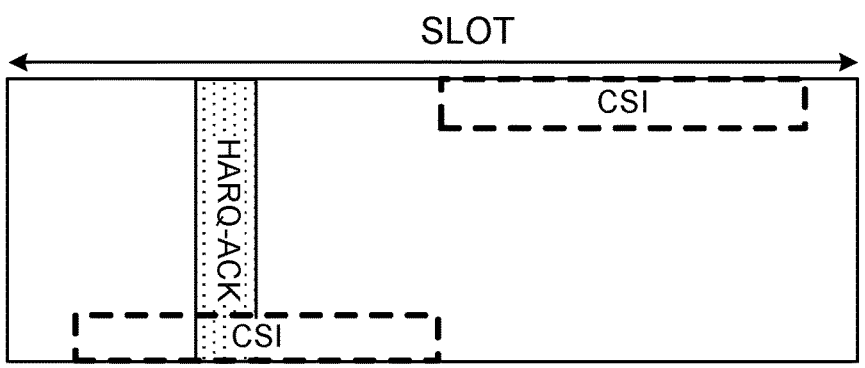

When the transmission timing of the HARQ-ACK overlaps with the PUCCH for the CSI as illustrated in FIGS. 9B to 9D, the user terminal may control transmission of the HARQ-ACK and the CSI based on a timing at which the PUCCH for the HARQ-ACK starts.

When the PUCCH for the HARQ-ACK (e.g., short PUCCH) starts at a timing identical to the PUCCH for the CSI (e.g., long PUCCH) as illustrated in FIG. 9B, the user terminal may multiplex and transmit the HARQ-ACK and the CSI on an identical channel (e.g., short PUCCH).

When the PUCCH for the HARQ-ACK (e.g., short PUCCH) starts before the PUCCH for the CSI (e.g., long PUCCH) as illustrated in FIG. 9C, the user terminal may transmit the HARQ-ACK by using the PUCCH for the HARQ-ACK (e.g., short PUCCH), and drop the CSI.

Alternatively, in FIG. 9C, the user terminal may transmit both of the HARQ-ACK and the CSI. When, for example, the CSI is P-CSI, the user terminal may transmit the HARQ-ACK and the CSI by using the PUCCH for the HARQ-ACK (an HARQ-ACK resource such as the short PUCCH). This is because a processing time for the P-CSI is sufficient even in a case illustrated in FIG. 9C.

When the PUCCH for the HARQ-ACK (e.g., short PUCCH) starts after the PUCCH for the CSI (e.g., long PUCCH) as illustrated in FIG. 9D, the user terminal may drop or cancel the CSI before starting transmitting the PUCCH for the HARQ-ACK (e.g., short PUCCH), and transmit the HARQ-ACK by using the PUCCH for the HARQ-ACK.

Alternatively, in FIG. 9D, the user terminal may transmit the HARQ-ACK and the CSI by using the PUCCH for the HARQ-ACK.

According to the fifth aspect, even when the transmission timing of the HARQ-ACK overlaps with the PUCCH for the CSI, it is possible to appropriately control transmission of the HARQ-ACK and the CSI based on the timing at which the PUCCH for the HARQ-ACK starts.

(Sixth Aspect)

The sixth aspect will describe transmission control of HARQ-ACK, and an SR and CSI that uses a PUCCH. FIG. 10 is a diagram illustrating one example of the transmission control of the HARQ-ACK and the CSI according to the sixth aspect. In addition, FIG. 10 illustrates a short PUCCH for the HARQ-ACK, a long PUCCH for the CSI and a short PUCCH for the SR. The PUCCHs used for the HARQ-ACK, the CSI and the SR are not limited to those illustrated in FIG. 10.

Figure 10A:
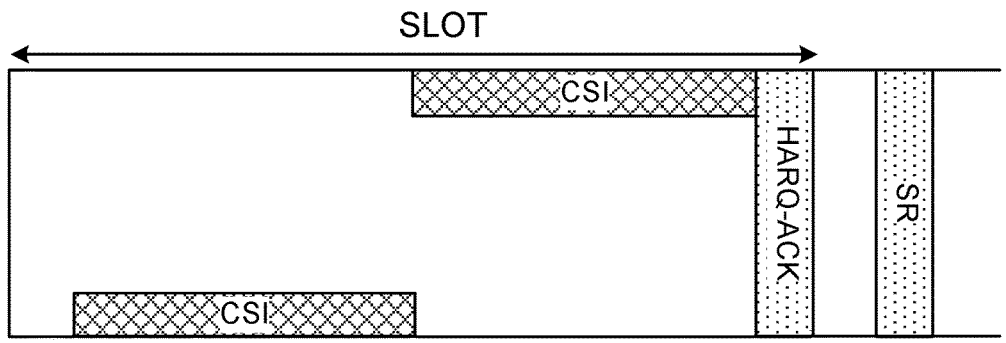
FIGS. 10A to 10D are diagrams illustrating one example of transmission control of HARQ-ACK and an SR according to a sixth aspect.

When a transmission timing of the HARQ-ACK does not overlap with any one of the PUCCHs for the CSI and the SR as illustrated in FIG. 10A, the user terminal may perform time division multiplexing on and transmit the PUCCH for the HARQ-ACK (e.g., short PUCCH), the PUCCH for the CSI (e.g., long PUCCH) and the PUCCH for the SR (e.g., short PUCCH).

Figure 10B:
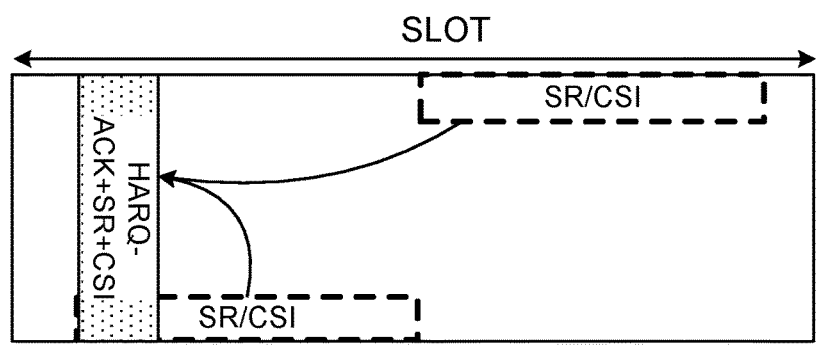
Figure 10C:
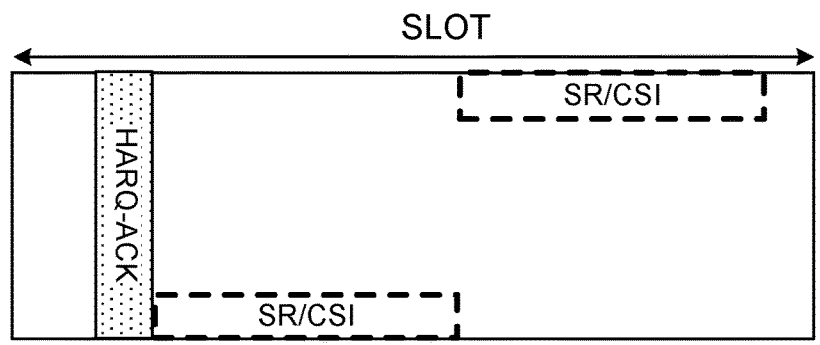
Figure 10D:
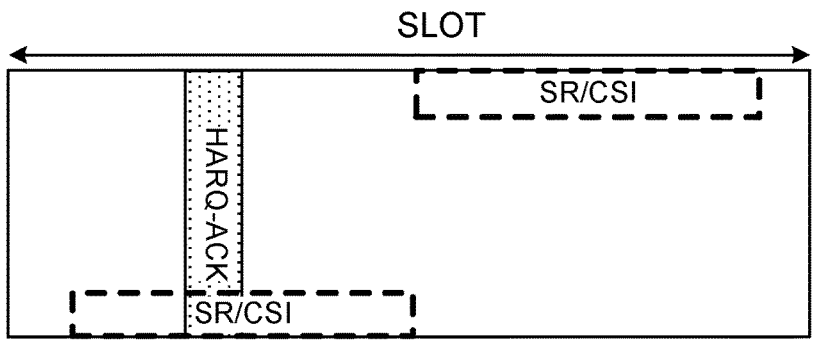

When the transmission timing of the HARQ-ACK does not overlap with the PUCCHs for the SR and the CSI as illustrated in FIGS. 10B to 10D, the user terminal may control transmission of the HARQ-ACK, and the SR and the CSI based on a timing at which the PUCCH for the HARQ-ACK starts.

When the PUCCH for the HARQ-ACK (e.g., short PUCCH) starts at a timing identical to the PUCCHs for the SR and the CSI (e.g., long PUCCHs) as illustrated in FIG. 10B, the user terminal may multiplex and transmit the HARQ-ACK, and the SR and the CSI on an identical channel (e.g., short PUCCH).

When the PUCCH for the HARQ-ACK (e.g., short PUCCH) starts before the PUCCH for the CSI (e.g., long PUCCH) as illustrated in FIG. 10C, the user terminal may transmit the HARQ-ACK by using the PUCCH for the HARQ-ACK (e.g., short PUCCH), drop the CSI and make transmission of the SR pend.

When the PUCCH for the HARQ-ACK (e.g., short PUCCH) starts after the PUCCH for the CSI (e.g., long PUCCH) as illustrated in FIG. 10D, the user terminal may drop or cancel the CSI or the SR before starting transmitting the PUCCH for the HARQ-ACK (e.g., short PUCCH), and transmit the HARQ-ACK by using the PUCCH for the HARQ-ACK.

According to the sixth aspect, even when the transmission timing of the HARQ-ACK overlaps with the PUCCHs for the SR and the CSI, it is possible to appropriately control transmission of the HARQ-ACK, and the SR and CSI based on a timing at which the PUCCH for the HARQ-ACK starts.

(Seventh Aspect)

A user terminal may determine a code rate of UCI to be transmitted by using a PUCCH based on a resource amount (e.g., the number of Resource Elements (REs)) used for transmission of the UCI, the number of bits of the UCI and a modulation order. For example, the user terminal may determine the code rate based on following equation (1).

$$\text{Code rate} = (\text{number of bits of UCI})/(\text{number of REs} \times \text{modulation order}) \quad \text{(Equation 1)}$$

The user terminal may control bundling and/or dropping of at least part of the UCI based on the calculated code rate and a maximum code rate configured in advance. More specifically, when the calculated code rate exceeds the maximum code rate, the user terminal may perform spatial bundling on the HARQ-ACK. When the code rate calculated after the spatial bundling still exceeds the maximum code rate, the user terminal may drop CSI of a lower priority until the code rate becomes lower than the maximum code rate.

Furthermore, spatial bundling of the HARQ-ACK and dropping of the CSI may be applied in reverse order. That is, the user terminal may drop the CSI of the lower priority when the calculated code rate exceeds the maximum code rate, and apply spatial bundling of the HARQ-ACK when the calculated code rate exceeds the maximum code rate even after all pieces of CSI are dropped.

The above maximum code rate may be configured to the user terminal per UCI. More specifically, the maximum code rate may be configured per UCI type, per PUCCH resource, per PUCCH format, per CSI type or per CSI process or may be configured per combination of at least two of these.

In this regard, the CSI type may be defined, for example, per Channel Quality indicator (CQI), Rank indicator (RI), Precoding Matrix Indicator (PMI), beam information (e.g., BI: Beam Index) or combination of at least two of these.

Furthermore, the CSI process is defined per combination of a measurement resource of a desired signal (desired signal measurement resource) and a measurement resource of an interference signal (interference signal measurement resource). The desired signal measurement resource may be a CSI-RS resource according to LTE or may employ a CSI-RS-based resource configuration or another new resource configuration. The interference signal measurement resource may be a CSI-Interference Measurement (CSI-IM) resource according to LTE, or may employ a CSI-IM-based resource configuration or another new resource configuration.

The user terminal may be configured per UCI type, per PUCCH resource, per CSI type or per CSI process, or may receive information indicating the maximum code rate per combination of at least two of these by using higher layer signaling.

It has been studied to split CSI into a plurality of parts (such as 2 parts) when the number of information bits to be fed back as the CSI is up to several hundreds of bits. When this control is performed, the maximum code rate may be configured per part or a priority may be configured between parts. When the CSI is split into a plurality of CSI parts and the priority is configured, a UCI bit sequence including CSI of a higher priority may include HARQ-ACK and/or an SR, and, in this case, the HARQ-ACK and the SR may be jointed and encoded (joint-encoded).

When a plurality of CSI parts are transmitted on different PUCCHs, or when different PUCCHs overlap, a PUCCH to be dropped may be selected based on the configured priority. When a plurality of CSI parts are transmitted on a single PUCCH or when the calculated code rate exceeds the maximum code rate, the CSI part of a higher priority may not be dropped as long as all pieces of CSI of CSI parts of a low priority are dropped.

The length (the number of bits) of Cyclic Redundancy Check (CRC) to be added to each part may differ according to the priority of each part of the CSI. Furthermore, a beta offset value used to encode the UCI to be subjected to piggyback to the PUSCH may differ according to the priority of each part.

According to the seventh aspect, it is possible to appropriately control a parameter (e.g., maximum code rate) used to encode the UCI to be transmitted by using the PUCCH.

(Eighth Aspect)

The eighth aspect will describe transmission control of UL data and/or UCI in a case where a PUSCH overlaps with the UCI that uses a PUCCH. A user terminal may transmit the UCI for the PUCCH that overlaps with the PUSCH (i.e., perform piggyback to the PUSCH) by using the PUSCH. Transmission of the UCI that uses the PUSCH may be referred to as UCI on a PUSCH.

When a start timing of an original PUCCH for the UCI is not later than (or is not subsequent to) a timing X0 matching a start timing of the PUSCH, the user terminal may rate-match uplink data to be transmitted on the PUSCH, and transmit the UCI by using the PUSCH.

When the start timing of the original PUCCH for the UCI is not later than (or is not subsequent to) the timing X0 matching the start timing of the PUSCH, the user terminal may puncture uplink data to be transmitted on the PUSCH, and transmit the UCI by using the PUSCH.

When the start timing of the original PUCCH for the UCI is later than (or is subsequent to) a given timing X1, the user terminal may drop the UCI or may not assume to transmit (perform piggyback on) the UCI by using the PUSCH. The timing X1 may be, for example, a given duration after the start timing of the PUSCH, and be later than the above timing X0.

The timing X1 and/or the timing X0 may be defined in advance by a specification, and information indicating the timing X1 and/or the timing X0 may be notified from a radio base station to the user terminal by higher layer signaling.

In addition, the above "start timing of the original PUCCH for the UCI" means a PUCCH transmission start timing that is used in a case where there is no PUSCH when the UCI is transmitted. This "start timing of the original PUCCH for the UCI" can be configured by higher layer signaling such as RRC, or can be indicated by DCI for scheduling the PDSCH, DCI for activating/releasing SPS/Grant-free resource and/or SP-CSI, and/or DCI for performing A-CSI triggering.

FIG. 11 is a diagram illustrating one example of piggyback of the UCI to the PUSCH according to the eighth aspect. FIG. 11A illustrates a case where at least part of allocation resources (time and/or frequency resources) for the PUSCH overlap with a long PUCCH. FIG. 11B illustrates a case where at least part of allocation resources (time and/or frequency resources) for the PUSCH overlap with a short PUCCH.

When a start timing of the long PUCCH is equal to a start timing of the PUSCH as illustrated in FIG. 11A, the user terminal may perform piggyback on the UCI to the PUSCH. In FIG. 11A, the user terminal may puncture uplink data, rate-match the uplink data or apply both of the puncturing and the rate matching to the uplink data for a PUSCH resource (e.g., Resource Element (RE)) on which the UCI is mapped.

When the start timing of the short PUCCH is not later than the timing X1 that is a given duration after the start timing of the PUSCH as illustrated in FIG. 11B, the user terminal may perform piggyback on the UCI to the PUSCH. In FIG. 11B, the user terminal may puncture the uplink data, rate-match the uplink data or apply both of the puncturing and the rate matching to the uplink data for the PUSCH resource (e.g., RE) on which the UCI is mapped.

On the other hand, when the start timing of the short PUCCH is later than the timing X1 that is the given duration after the start timing of the PUSCH as illustrated in FIG. 11B, the user terminal drop the UCI.

According to the eighth aspect, even when the transmission timing of the UCI overlaps with the PUSCH, it is possible to appropriately control piggyback and/or dropping of the UCI, and/or rate matching and/or puncturing of the uplink data.

(Ninth Aspect)

A user terminal needs to learn how much resources (e.g., REs) are necessary for UCI when performing piggyback on the UCI to a PUSCH. The user terminal may receive information (also referred to as UCI resource related information, a beta offset, a $\beta$ offset or $\beta_{Offset}$) used to determine the resource amount. The user terminal may control the resource amount for each UCI to be subjected to piggyback based on the beta offset.

According to the ninth aspect, one or more sets each including one or more beta offset values may be configured to the user terminal by higher layer signaling (e.g., RRC signaling). Furthermore, the DCI (e.g., DCI for scheduling the PUSCH) may indicate one of the sets. The user terminal controls transmission of the UCI that uses the PUSCH to be scheduled by the DCI based on the beta offset value in the set.

Each set may include one or more beta offset values matching a UCI type. In this regard, the UCI type may include a plurality of types such as CSI, CSI+HARQ-ACK, CSI+SR, CSI+SR+HARQ-ACK and two-part CSI. A plurality of beta offset values matching these UCI types may be included in each set.

Furthermore, the beta offset values included in each set may be defined based on at least one of a UL waveform (e.g., a DFT spreading OFDM waveform or an OFDM waveform), and a UCI multiplexing mechanism (e.g., rate matching or puncturing).

The number of above sets configured to the user terminal by higher layer signaling may be 2, 4 or 8. In this case, 1, 2 or 3 bits in the DCI may indicate one of the above sets.

Thus, the user terminal may determine a beta offset value matching the UCI (e.g., at least one of the UCI type, the UL waveform and the UCI multiplexing mechanism) based on instruction information (e.g., information indicating one of the above sets) in the DCI (UL grant) for scheduling the PUSCH, and determine a resource amount of the UCI to be subjected to piggyback based on the beta offset value.

According to the ninth aspect, it is possible to appropriately control a parameter (e.g., beta offset) used to encode the UCI to be transmitted by using the PUSCH.

(Tenth Aspect)

The ninth aspect has described a case where a beta offset value (or a set of one or more beta offset values) used for transmission control of UCI that uses a PUSCH is indicated based on DCI for scheduling the PUSCH. The tenth aspect will describe a case where there is no beta offset value (or the above set) indicated by the DCI.

A user terminal may use a default beta offset value when there is no beta offset indicated by the DCI. The default beta offset value may be defined by a specification per UCI (e.g., at least one of a UCI type, a UL waveform and a UCI multiplexing mechanism) or may be configured by higher layer signaling.

Alternatively, the user terminal may assume that all resources allocated to the PUSCH are used for the UCI irrespectively of performance of the PUSCH.

(Eleventh Aspect)

The eleventh aspect will describe transmission control of UCI when uplink (UL) Multi Input Multi Output (MIMO) is applied. According to uplink MIMO, a plurality of Transport Blocks (TBs) of uplink data are transmitted in respectively different layers. The number of layers will be also referred to as a rank, and a Rank Identifier (RI) indicates the rank (the number of layers).

DCI (UL DCI) for scheduling a PUSCH to which uplink MIMO (UL MIMO) is applied may (1) indicate a single beta offset value (or a single set including one or more beta offset values), or (2) indicate a plurality of beta offset values (or a set per layer) respectively associated with a plurality of layers (or TBs).

When (1) the above DCI indicates a single beta offset value (or a single set), a user terminal may apply an identical beta offset value indicated by the DCI to a plurality of TBs.

Alternatively, the user terminal may apply to the single TB (e.g., TB 1) a beta offset value indicated by the DCI, and apply to another TB (e.g., TB 2) a value obtained by giving a given offset (also referred to as, for example, a delta offset, a δ offset and $\delta_{offset}$) to the beta offset value. The given offset may be associated with at least one of Transport Block Size (TBS) of the another TB, a Modulation and Coding Scheme (MCS) and a Redundancy Version (RV).

Furthermore, when UL MIMO is applied to a PUSCH, the user terminal may successively map the UCI over a plurality of layers (or TBs). The user terminal may make copies of the UCI corresponding to a plurality of layers (or the TBs), and map the obtained copies on the corresponding layers (or the TBs). Alternatively, the UCI may be mapped on a layer of a specific TB of a higher MCS.

These mapping methods may be separately controlled according to a UCI type (e.g., HARQ-ACK, an SR or CSI), a service type (e.g., an eMBB or URLLC) matching the UCI, and an original PUCCH format (e.g., a short PUCCH format such as PUCCH formats 0/1 or a long PUCCH format such as PUCCH formats 2/3/4) matching the UCI.

(Radio Communication System)

The configuration of the radio communication system according to the present embodiment will be described below. This radio communication system is applied the radio communication method according to each of the above aspects. In addition, the radio communication method according to each of the above aspects may be each applied alone or may be applied by combining at least two of the radio communication methods.

Figure 12:
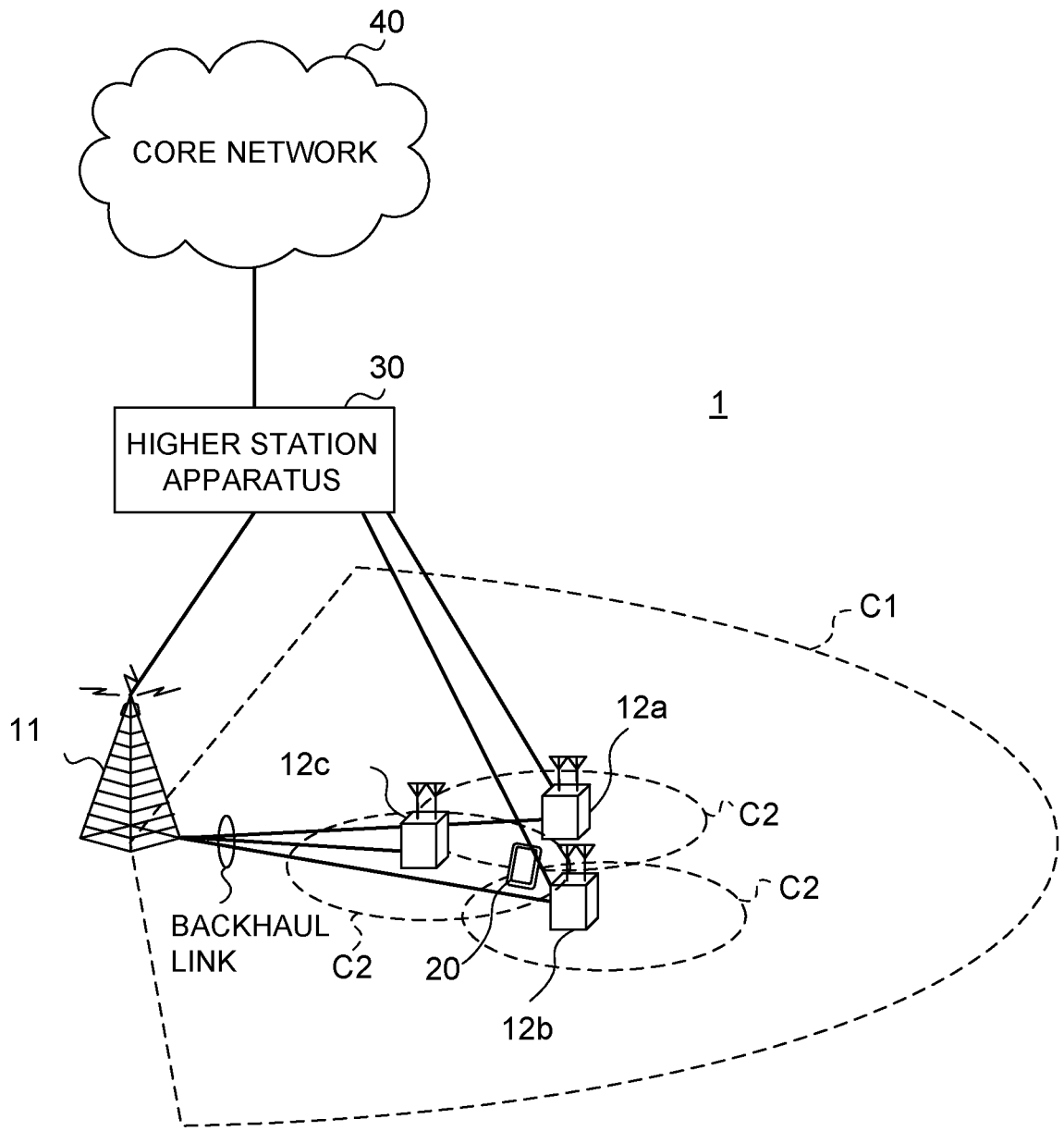
FIG. 12 is a diagram illustrating one example of a schematic configuration of a radio communication system according to the present embodiment.

FIG. 12 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system. In this regard, the radio communication system 1 may be referred to as SUPER 3G, LTE-Advanced (LTE-A), IMT-Advanced, 4G, 5G, Future Radio Access (FRA) and the New Radio Access Technology (NR: New-RAT).

The radio communication system 1 illustrated in FIG. 12 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. Different numerologies may be configured to be applied between cells and/or in a cell.

In addition, the numerology is a communication parameter (e.g., at least one of a spacing of a sub-carrier (sub-carrier spacing), a bandwidth, a symbol length, a CP time duration (CP length), a subframe length, a TTI time duration (TTI length), the number of symbols per TTI, a radio frame configuration, filtering processing and windowing processing) in a frequency direction and/or a time direction. The radio communication system 1 may support sub-carrier spacings such as 15 kHz, 30 kHz, 60 kHz, 120 kHz and 240 kHz.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two or more CCs). Furthermore, the user terminal can use licensed band CCs and unlicensed band CCs as a plurality of cells.

Furthermore, the user terminal 20 can perform communication by using Time Division Duplex (TDD) or Frequency Division Duplex (FDD) in each cell. A TDD cell and an FDD cell may be each referred to as a TDD carrier (frame configuration type 2) and an FDD carrier (frame configuration type 1).

Furthermore, each cell (carrier) may be applied a single numerology or may be applied a plurality of different numerologies.

The user terminal 20 and the radio base station 11 can communicate by using a carrier (also referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB), a gNodeB (gNB) or a transmission/reception point (TRP). Furthermore, each radio base station 12 is a radio base station that has a local coverage, and may be referred to as a small base station, a micro base station, a pico base station, a femto base station, a Home eNodeB (HeNB), a Remote Radio Head (RRH), an eNB, a gNB or a transmission/reception point. The radio base stations 11 and 12 will be collectively referred to as a radio base station 10 below when not distinguished.

Each user terminal 20 is a terminal that supports various communication schemes such as LTE, LTE-A, 5G and NR and may include not only a mobile communication terminal but also a fixed communication terminal. Furthermore, the user terminal 20 can perform Device-to-Device communication (D2D) with the other user terminal 20.

The radio communication system 1 applies Orthogonal Frequency-Division Multiple Access (OFDMA) to downlink (DL) and Single Carrier Frequency Division Multiple Access (SC-FDMA) to uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and OFDMA may be used on UL.

Furthermore, the radio communication system 1 may use a multicarrier waveform (e.g., OFDM waveform) or may use a single carrier waveform (e.g., DFT-s-OFDM waveform).

The radio communication system 1 uses a DL shared channel (also referred to as a PDSCH: Physical Downlink Shared Channel or a downlink data channel) shared by each user terminal 20, a broadcast channel (PBCH: Physical Broadcast Channel) and an L1/L2 control channel as downlink (DL) channels. User data, higher layer control information and System Information Blocks (SIBs) are conveyed on the PDSCH. Furthermore, Master Information Blocks (MIBs) are conveyed on the PBCH.

The L1/L2 control channel includes downlink control channels (a Physical Downlink Control Channel (PDCCH) and an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. The EPDCCH is subjected to frequency division multiplexing with the PDSCH and is used to convey DCI similar to the PDCCH. Retransmission control information of HARQ (ACK/NACK) for the PUSCH is conveyed on at least one of the PHICH, the PDCCH and the EPDCCH.

The radio communication system 1 uses an uplink shared channel (also referred to as a PUSCH: Physical Uplink Shared Channel or an uplink data channel) shared by each user terminal 20, an uplink control channel (PUCCH: Physical Uplink Control Channel), and a random access channel (PRACH: Physical Random Access Channel) as uplink (UL) channels. User data and higher layer control information are conveyed on the PUSCH. Uplink Control Information (UCI) including at least one of retransmission control information (A/N) of a downlink (DL) signal and Channel State Information (CSI) is conveyed on the PUSCH or the PUCCH. A random access preamble for establishing connection with a cell can be conveyed on the PRACH.

<Radio Base Station>

Figure 13:
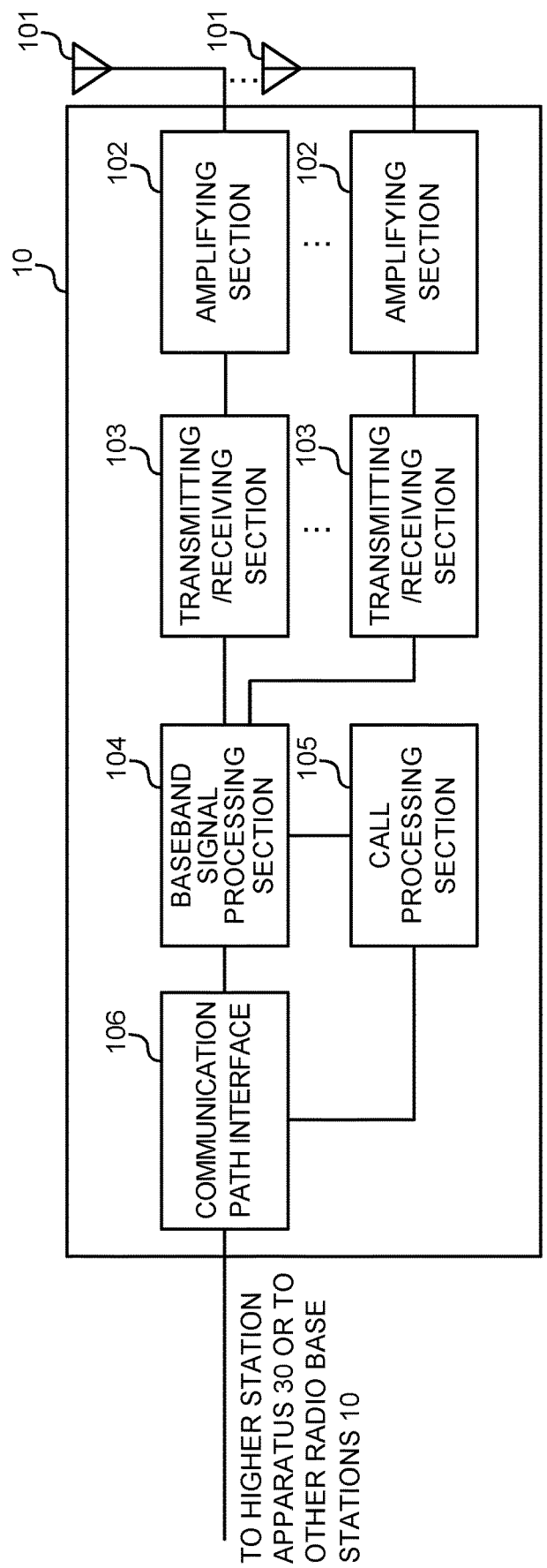
FIG. 13 is a diagram illustrating one example of an overall configuration of a radio base station according to the present embodiment.

FIG. 13 is a diagram illustrating one example of an overall configuration of the radio base station according to the present embodiment. The radio base station 10 includes pluralities of transmission/reception antennas 101, amplifying sections 102 and transmitting/receiving sections 103, a baseband signal processing section 104, a call processing section 105 and a channel interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., Hybrid Automatic Repeat reQuest (HARQ) transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency band, and transmits a radio frequency signal. The radio frequency signal subjected to frequency conversion by each transmitting/receiving section 103 is amplified by each amplifying section 102, and is transmitted from each transmission/reception antenna 101.

The transmitting/receiving sections 103 can be composed of transmitters/receivers, transmission/reception circuits or transmission/reception apparatuses described based on a common knowledge in a technical field according to the present invention. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmission/reception antenna 101 as an uplink (UL) signal. Each transmitting/receiving section 103 receives the UL signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on UL data included in the input UL signal, and transfers the UL data to the higher station apparatus 30 via the channel interface 106. The call processing section 105 performs call processing such as configuration and release of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the neighboring radio base station 10 via an inter-base station interface (e.g., optical fibers compliant with the Common Public Radio Interface (CPRI) or the X2 interface).

Furthermore, each transmitting/receiving section 103 transmits the downlink (DL) signal (including at least one of a DL data signal, a DL control signal and a DL reference signal) to the user terminal 20, and receives the uplink (UL) signal (including at least one of a UL data signal, a UL control signal and a UL reference signal) from the user terminal 20.

Furthermore, each transmitting/receiving section 103 receives the UCI from the user terminal 20 by using an uplink data channel (e.g., PUSCH) or uplink control channels (e.g., a short PUCCH and/or a long PUCCH). The UCI may include at least one of HARQ-ACK of a downlink data channel (e.g., PDSCH), CSI, an SR, beam identification information (e.g., Beam Index (BI)) and a Buffer Status Report (BSR).

Furthermore, each transmitting/receiving section 103 transmits control information (higher layer control information) of higher layer signaling, and Downlink Control Information (DCI) of physical layer signaling. More specifically, each transmitting/receiving section 103 may transmit at least one of configuration information indicating a PUCCH resource (the first, third and seventh aspects), information indicating an association between a PUCCH format and/or a duration (a length such as a long or short duration), and an SR (second aspect), information indicating an association between P-CSI and the PUCCH format (third aspect), information indicating timings X0 and/or X1 (eighth aspect), information indicating a maximum code rate (seventh aspect), and information related to a beta offset (the ninth to eleventh aspects) by physical layer signaling (L1 signaling) and/or higher layer signaling.

Figure 14:
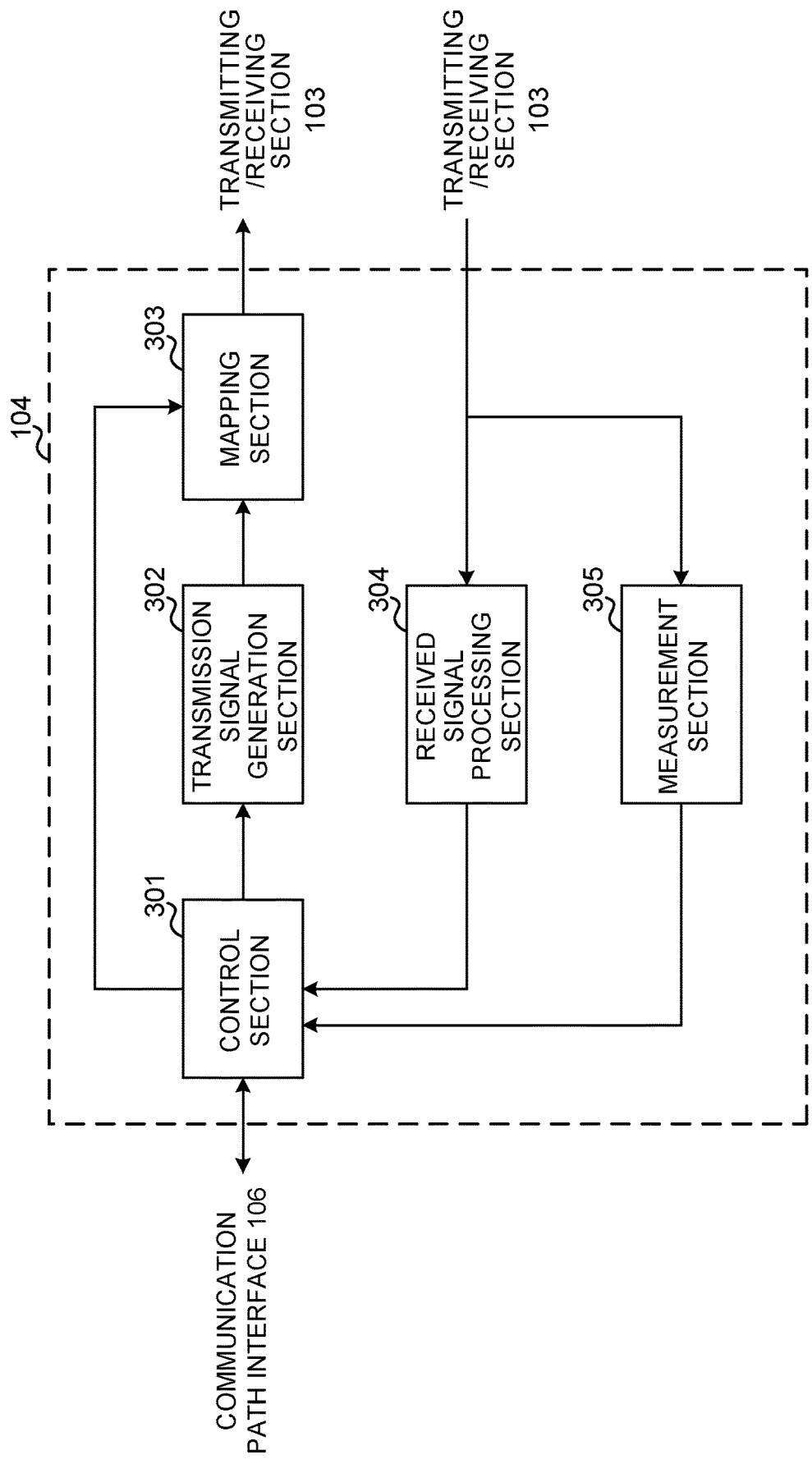
FIG. 14 is a diagram illustrating one example of a function configuration of the radio base station according to the present embodiment.

FIG. 14 is a diagram illustrating one example of a function configuration of the radio base station according to the present embodiment. In addition, FIG. 14 mainly illustrates function blocks of characteristic portions according to the present embodiment, and assumes that the radio base station 10 includes other function blocks, too, that are necessary for radio communication. As illustrated in FIG. 14, the baseband signal processing section 104 includes a control section 301, a transmission signal generating section 302, a mapping section 303, a received signal processing section 304 and a measurement section 305.

The control section 301 controls the entire radio base station 10. The control section 301 controls, for example, DL signal generation of the transmission signal generating section 302, DL signal mapping of the mapping section 303, UL signal reception processing (e.g., demodulation) of the received signal processing section 304, and measurement of the measurement section 305.

More specifically, the control section 301 schedules the user terminal 20. More specifically, the control section 301 may perform scheduling and/or retransmission control on the downlink data channel and/or the uplink data channel based on the UCI (e.g., the CSI and/or the BI) from the user terminal 20.

Furthermore, the control section 301 may control configurations (formats) of the uplink control channels (e.g., the long PUCCH and/or the short PUCCH), and perform control to transmit control information related to the uplink control channels.

Furthermore, the control section 301 may control a code rate (e.g., maximum code rate) of the UCI on the first and second uplink control channels (e.g., the long PUCCH and the short PUCCH), and control transmission of information indicating the maximum code rate.

Furthermore, the control section 301 may control a PUCCH resource.

The control section 301 may control the received signal processing section 304 to perform reception processing on the UCI from the user terminal 20 based on the format of the uplink control channel.

The control section 301 can be composed of a controller, a control circuit or a control apparatus described based on the common knowledge in the technical field according to the present invention.

The transmission signal generating section 302 generates a DL signal (including a DL data signal, a DL control signal and a DL reference signal) based on an instruction from the control section 301, and outputs the DL signal to the mapping section 303.

The transmission signal generating section 302 can be composed of a signal generator, a signal generating circuit or a signal generating apparatus described based on the common knowledge in the technical field according to the present invention.

The mapping section 303 maps the DL signal generated by the transmission signal generating section 302, on a given radio resource based on the instruction from the control section 301, and outputs the DL signal to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a UL signal (including, for example, a UL data signal, a UL control signal and a UL reference signal) transmitted from the user terminal 20. More specifically, the received signal processing section 304 outputs the received signal and the signal after the reception processing to the measurement section 305. Furthermore, the received signal processing section 304 performs reception processing on the UCI based on the uplink control channel configuration instructed by the control section 301.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure UL channel quality based on, for example, received power (e.g., Reference Signal Received Power (RSRP)) and/or received quality (e.g., Reference Signal Received Quality (RSRQ)) of the UL reference signal. The measurement section 305 may output a measurement result to the control section 301.

<User Terminal>

Figure 15:
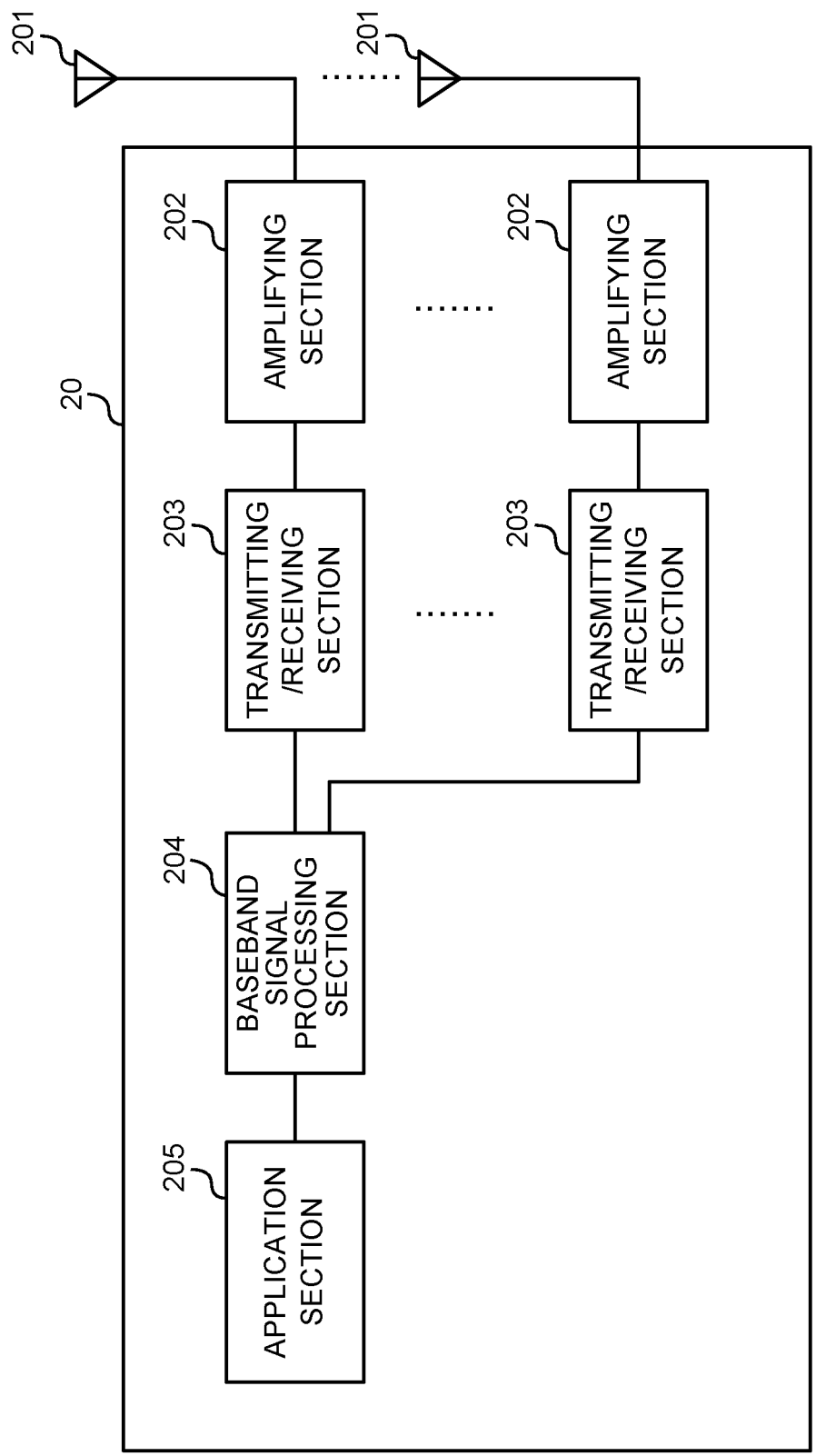
FIG. 15 is a diagram illustrating one example of an overall configuration of a user terminal according to the present embodiment.

FIG. 15 is a diagram illustrating one example of an overall configuration of the user terminal according to the present embodiment. The user terminal 20 includes pluralities of transmission/reception antennas 201 for MIMO transmission, amplifying sections 202 and transmitting/receiving sections 203, a baseband signal processing section 204 and an application section 205.

The amplifying sections 202 amplify radio frequency signals received at a plurality of transmission/reception antennas 201. Each transmitting/receiving section 203 receives a DL signal amplified by each amplifying section 202. Each transmitting/receiving section 203 performs frequency conversion on the received signal into a baseband signal, and outputs the baseband signal to the baseband signal processing section 204.

The baseband signal processing section 204 performs FFT processing, error correcting decoding, and reception processing of retransmission control on the input baseband signal. The baseband signal processing section 204 transfers DL data to the application section 205. The application section 205 performs processing related to layers higher than a physical layer and an MAC layer. Furthermore, the baseband signal processing section 204 may transfer broadcast information, too, to the application section 205.

On the other hand, the application section 205 inputs uplink (UL) data to the baseband signal processing section 204. The baseband signal processing section 204 performs transmission processing of retransmission control (e.g., HARQ transmission processing), channel coding, rate matching, puncturing, Discrete Fourier Transform (DFT) processing and IFFT processing on the uplink data, and transfers the uplink data to each transmitting/receiving section 203. The baseband signal processing section 204 performs at least one of channel coding, rate matching, puncturing, DFT processing and IFFT processing on the UCI, too, and transfers the UCI to each transmitting/receiving section 203.

Each transmitting/receiving section 203 converts the baseband signal output from the baseband signal processing section 204 into a radio frequency band, and transmits a radio frequency signal. The radio frequency signal subjected to the frequency conversion by each transmitting/receiving section 203 is amplified by each amplifying section 202, and is transmitted from each transmission/reception antenna 201.

Furthermore, each transmitting/receiving section 203 receives the downlink (DL) signal (including the DL data signal, the DL control signal and the DL reference signal) of a numerology configured to the user terminal 20, and receives the UL signal (including the UL data signal, the UL control signal and the UL reference signal) of the numerology.

Furthermore, each transmitting/receiving section 203 transmits UCI to the radio base station 10 by using the uplink data channel (e.g., PUSCH) or the uplink control channels (e.g., the short PUCCH and/or the long PUCCH).

Furthermore, each transmitting/receiving section 203 receives control information (higher layer control information) of higher layer signaling, and Downlink Control Information (DCI) of physical layer signaling. More specifically, each transmitting/receiving section 203 may transmit at least one of configuration information indicating the PUCCH resource (the first, third and seventh aspects), information indicating the association between the PUCCH format and/or the duration (the length such as a long or short duration), and the SR (second aspect), information indicating the association between the P-CSI and the PUCCH format (third aspect), information indicating the timings X0 and/or X1 (eighth aspect), information indicating the maximum code rate (seventh aspect), and information related to the beta offset (the ninth to eleventh aspects) by physical layer signaling (L1 signaling) and/or higher layer signaling.

The transmitting/receiving sections 203 can be composed as transmitters/receivers, transmission/reception circuits or transmission/reception apparatuses described based on the common knowledge in the technical field according to the present invention. Furthermore, the transmitting/receiving sections 203 may be composed as an integrated transmitting/receiving section or may be composed of transmitting sections and receiving sections.

Figure 16:
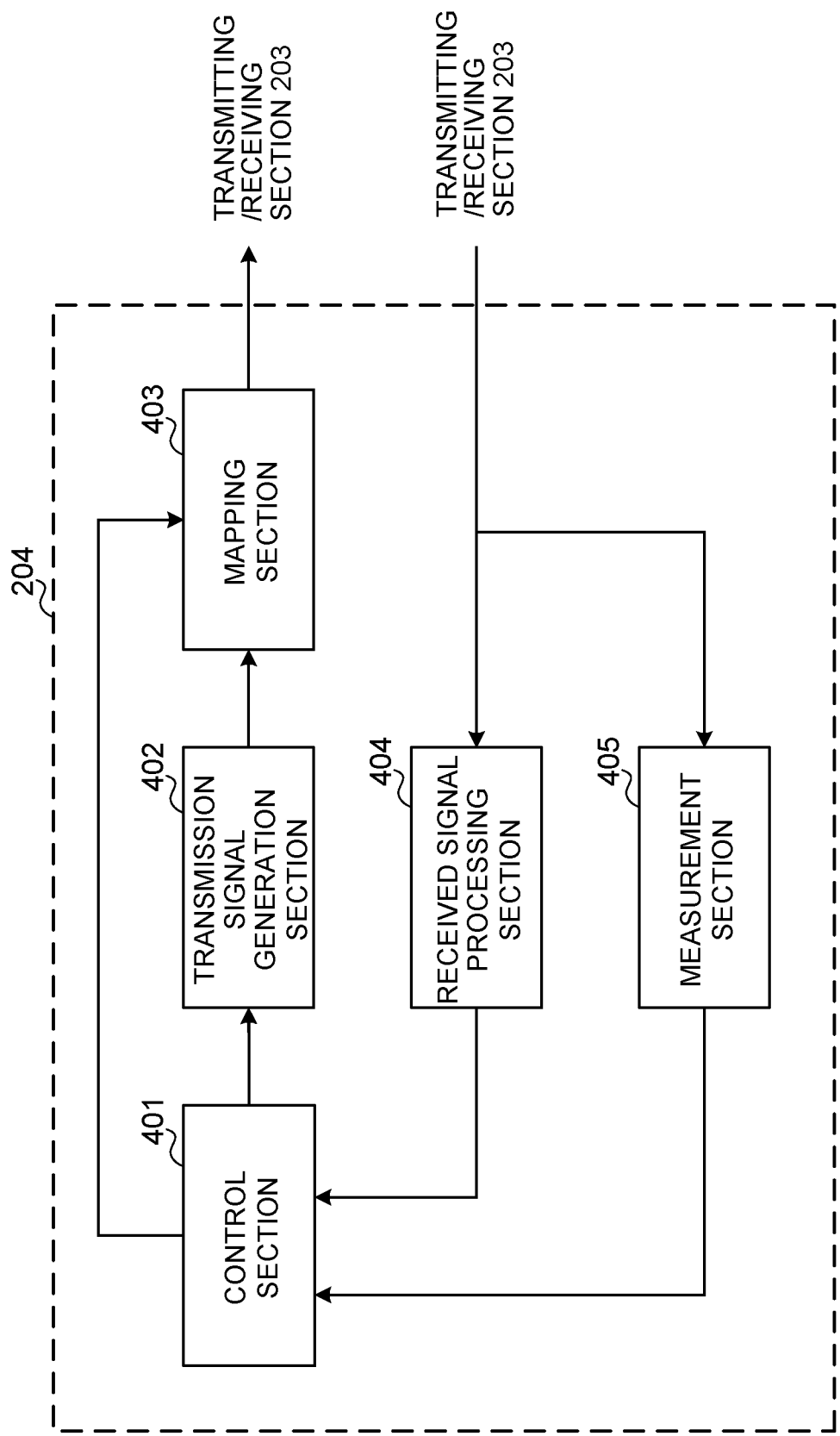
FIG. 16 is a diagram illustrating one example of a function configuration of the user terminal according to the present embodiment.

FIG. 16 is a diagram illustrating one example of a function configuration of the user terminal according to the present embodiment. In addition, FIG. 16 mainly illustrates function blocks of characteristic portions according to the present embodiment, and assumes that the user terminal 20 includes other function blocks, too, that are necessary for radio communication. As illustrated in FIG. 16, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls, for example, UL signal generation of the transmission signal generating section 402, UL signal mapping of the mapping section 403, DL signal reception processing of the received signal processing section 404, and measurement of the measurement section 405.

Furthermore, the control section 401 controls the uplink control channel used for transmission of the UCI from the user terminal 20 based on an explicit instruction from the radio base station 10 or explicit determination of the user terminal 20.

Furthermore, the control section 401 may control the configurations (formats) of the uplink control channels (e.g., the long PUCCH and/or the short PUCCH). The control section 401 may control the formats of the uplink control channels based on control information from the radio base station 10.

Furthermore, the control section 401 may control transmission of the UCI based on the maximum code rate notified from the radio base station 10.

Furthermore, when a first uplink control channel (short PUCCH) and a second uplink control channel (long PUCCH) are subjected to time division multiplexing in one or more slots, the control section 401 may control transmission of the UCI.

The control section 401 may determine an uplink control channel used for transmission of HARQ-ACK (retransmission control information) based on the Downlink Control Information (DCI) used for scheduling of the PDSCH or the scheduling of the PDSCH (first aspect).

The control section 401 may determine the uplink control channel used for transmission of the Scheduling Request (SR) based on higher layer signaling (second aspect).

The control section 401 may determine the uplink control channel used for transmission of the Channel State Information (CSI) based on the Downlink Control Information (DCI) including trigger information of CSI reporting or higher layer signaling (third aspect).

When a transmission timing of HARQ-ACK (retransmission control information) does not overlap with an uplink control channel for the SR and/or an uplink control channel for the CSI, the control section 401 may perform time division multiplexing on an uplink control channel for the HARQ-ACK, and the uplink control channel for the SR and/or the uplink control channel for the CSI (the fourth to sixth aspects).

When the transmission timing of the HARQ-ACK (retransmission control information) overlaps with the uplink control channel for the SR and/or the uplink control channel for the CSI, the control section 401 may control transmission of the HARQ-ACK, and the SR and/or the CSI based on a timing at which the uplink control channel for the HARQ-ACK starts (the fourth to sixth aspects).

When the uplink control channel for the UCI overlaps at least part of an allocation resource for the PUSCH (uplink data channel), the control section 401 may control rate matching of the PUSCH, and/or dropping of at least part of the UCI based on the start timing of the uplink control channel (eighth aspect).

The control section 401 may control encoding of the UCI based on the maximum code rate notified from the radio base station 10 (seventh aspect).

Furthermore, the control section 401 may control encoding of the UCI to be transmitted by using the PUSCH based on the beta offset value notified from the radio base station 10 or a default beta offset value (the ninth and tenth aspects).

Furthermore, when uplink data of a plurality of layers is transmitted on the PUSCH, the control section 401 may control encoding and/or mapping of the UCI to be transmitted by using the PUSCH (eleventh aspect).

Furthermore, the control section 401 may determine the PUCCH resource used by the PUCCH format based on higher layer signaling and/or downlink control information.

The control section 401 may control at least one of the transmission signal generating section 402, the mapping section 403 and each transmitting/receiving section 203 to perform transmission processing on the UCI based on the PUCCH format.

The control section 401 can be composed of a controller, a control circuit or a control apparatus described based on the common knowledge in the technical field according to the present invention.

The transmission signal generating section 402 generates (e.g., encodes, rate-matches, punctures or modulates) a UL signal (including a UL data signal, a UL control signal, a UL reference signal and UCI) based on an instruction from the control section 401, and outputs the UL signal to the mapping section 403. The transmission signal generating section 402 can be composed of a signal generator, a signal generating circuit or a signal generating apparatus described based on the common knowledge in the technical field according to the present invention.

The mapping section 403 maps the UL signal generated by the transmission signal generating section 402, on a radio resource based on the instruction from the control section 401, and outputs the UL signal to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the DL signal (a DL data signal, scheduling information, a DL control signal or a DL reference signal). The received signal processing section 404 outputs information received from the radio base station 10 to the control section 401. The received signal processing section 404 outputs, for example, broadcast information, system information, higher layer control information of higher layer signaling such as RRC signaling and physical layer control information (L1/L2 control information) to the control section 401.

The received signal processing section 404 can be composed of a signal processor, a signal processing circuit or a signal processing apparatus described based on the common knowledge in the technical field according to the present invention. Furthermore, the received signal processing section 404 can compose the receiving section according to the present invention.

The measurement section 405 measures a channel state based on a reference signal (e.g., CSI-RS) from the radio base station 10, and outputs a measurement result to the control section 401. In addition, the measurement section 405 may measure the channel state per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 17:
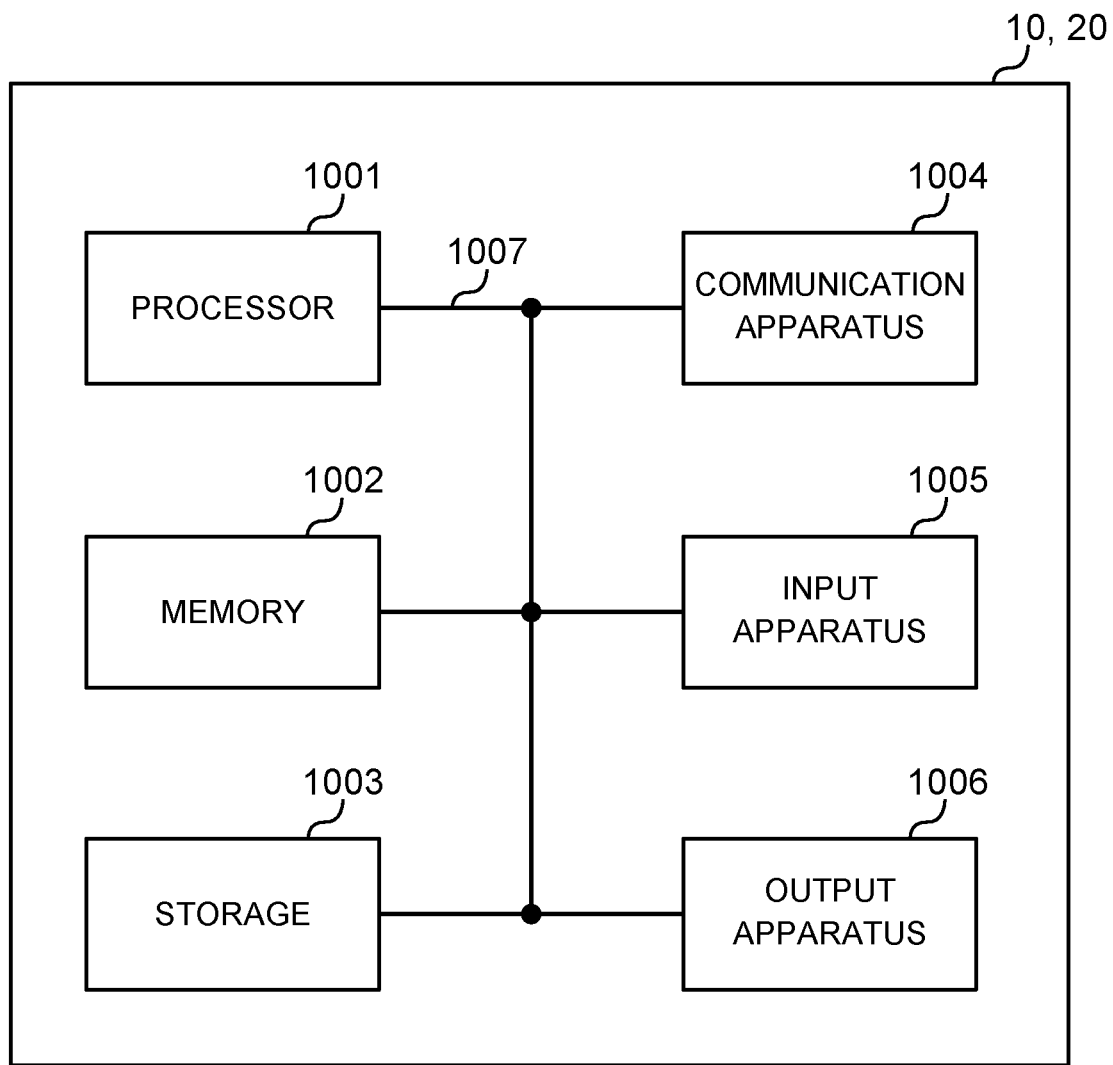
FIG. 17 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 17 is a diagram illustrating one example of the hardware configurations of the radio base station and the user terminal according to the present embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 17 or may be configured without including part of the apparatuses.

For example, FIG. 17 illustrates the only one processor 1001. However, there may be a plurality of processors. Furthermore, processing may be executed by one processor or processing may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using a bus that is different per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

(Modified Example)

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a sub slot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspects/embodiment described in this description and may be performed by using other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only explicitly but also implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description can be compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a transmission/reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

The base station and/or the mobile station may be referred to as a transmission apparatus or a reception apparatus.

Furthermore, the radio base station in this description may be read as the user terminal. For example, each aspect/ embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of the physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description intends for exemplary explanation, and does not bring any restrictive meaning to the present invention.

The invention claimed is:

1. A terminal comprising:
   a transmitter that transmits uplink control information (UCI) including at least one of a Hybrid Automatic Repeat reQuest-Acknowledgement (HARQ-ACK), a scheduling request (SR), and a channel state information (CSI); and
   a processor that, when an uplink control channel for the UCI overlaps an uplink shared channel, punctures an uplink data transmitted on the uplink shared channel and controls to transmit the UCI by using the uplink shared channel, based on a start timing of the uplink control channel, and controls a number of resources used for the transmission of the UCI based on information related to a beta offset transmitted by radio resource control (RRC) signaling,
   wherein the processor determines the start timing of the uplink control channel based on a value of a field indicating a feedback timing of the HARQ-ACK included in a downlink control information format for scheduling a downlink shared channel.

2. The terminal according to claim 1, wherein the processor determines a format of the uplink control channel by an HARQ-ACK timing indicated by the value of the field.

3. A radio communication method for a terminal comprising:
- transmitting uplink control information (UCI) including at least one of a Hybrid Automatic Repeat reQuest-Acknowledgement (HARQ-ACK), a scheduling request (SR), and a channel state information (CSI);
- when an uplink control channel for the UCI overlaps an uplink shared channel, puncturing an uplink data transmitted on the uplink shared channel and controlling to transmit the UCI by using the uplink shared channel, based on a start timing of the uplink control channel;
- controlling a number of resources used for the transmission of the UCI based on information related to a beta offset transmitted by radio resource control (RRC) signaling; and
- determining the start timing of the uplink control channel based on a value of a field indicating a feedback timing of the HARQ-ACK included in a downlink control information format for scheduling a downlink shared channel.

4. A base station comprising:
- a receiver that receives uplink control information (UCI) including at least one of a Hybrid Automatic Repeat reQuest-Acknowledgement (HARQ-ACK), a scheduling request (SR), and a channel state information (CSI); and
- a processor that, when an uplink control channel for the UCI overlaps an uplink shared channel, controls to receive the UCI transmitted using the uplink shared channel by puncturing an uplink data transmitted on the uplink shared channel, a transmission thereof controlled by a terminal based on a start timing of the uplink control channel, and indicates to control a number of resources used for the transmission of the UCI based on information related to a beta offset transmitted by radio resource control (RRC) signaling,
- wherein the start timing of the uplink control channel is determined based on a value of a field indicating a feedback timing of the HARQ-ACK included in a downlink control information format for scheduling a downlink shared channel.

5. A system comprising a terminal and a base station, wherein:
- the terminal comprises:
  - a transmitter that transmits uplink control information (UCI) including at least one of a Hybrid Automatic Repeat reQuest-Acknowledgement (HARQ-ACK), a scheduling request (SR), and a channel state information (CSI); and
  - a processor that, when an uplink control channel for the UCI overlaps an uplink shared channel, punctures an uplink data transmitted on the uplink shared channel and controls to transmit the UCI by using the uplink shared channel, based on a start timing of the uplink control channel, and controls a number of resources used for the transmission of the UCI based on information related to a beta offset transmitted by radio resource control (RRC) signaling,
  - wherein the processor further determines the start timing of the uplink control channel based on a value of a field indicating a feedback timing of the HARQ-ACK included in a downlink control information format for scheduling a downlink shared channel; and
- the base station comprises:
  - a receiver that receives the UCI; and
  - a processor that, when the uplink control channel for the UCI overlaps the uplink shared channel, controls to receive the UCI transmitted using the uplink shared channel by puncturing the uplink data transmitted on the uplink shared channel, the transmission of the UCI being controlled by the terminal based on the start timing of the uplink control channel, and indicates to control the number of resources used for the transmission of the UCI based on the information related to the beta offset transmitted by the RRC signaling.

* * * * *